(12) United States Patent  
Snow

(10) Patent No.: US 9,260,251 B2
(45) Date of Patent: Feb. 16, 2016

(54) MULTI-ROW MAGNETIC DIAL FOR THE CONVEYANCE OF WORKPIECES AND RELATED METHOD

(71) Applicant: ND Industries, Inc., Clawson, MI (US)

(72) Inventor: Gerald F. Snow, Almont, MI (US)

(73) Assignee: ND Industries, Inc., Clawson, MI (US)

( * ) Notice: Subject to any disclaimer, the term of this patent is extended or adjusted under 35 U.S.C. 154(b) by 10 days.

(21) Appl. No.: 14/325,886

(22) Filed: Jul. 8, 2014

(65) Prior Publication Data

US 2015/0014126 A1 Jan. 15, 2015

Related U.S. Application Data

(60) Provisional application No. 61/843,927, filed on Jul. 9, 2013.

(51) Int. Cl.
*B65G 47/00* (2006.01)
*B65G 29/00* (2006.01)
*B05C 13/02* (2006.01)
*B05B 13/02* (2006.01)
(Continued)

(52) U.S. Cl.
CPC ............ *B65G 29/00* (2013.01); *B05B 13/0242* (2013.01); *B05C 13/025* (2013.01); *B05C 5/022* (2013.01); *B05D 2202/00* (2013.01); *B05D 2258/02* (2013.01); *B65G 47/848* (2013.01)

(58) Field of Classification Search
CPC .. B65G 47/848; B65G 47/06; B65G 47/5136; B05B 13/0242
USPC .................... 198/396, 690.1, 472.1
See application file for complete search history.

(56) References Cited

U.S. PATENT DOCUMENTS 2,264,348 A 12/1941 Weygant
2,816,790 A 12/1957 Johnson
2,862,752 A 12/1958 Heppner
(Continued)

FOREIGN PATENT DOCUMENTS

DE 10018656 11/2000
EP 2607273 A1 6/2013
(Continued)

OTHER PUBLICATIONS

International Search Report and Written Opinion of International Application No. PCT/US2014/045785, dated Jan. 26, 2015.
(Continued)

*Primary Examiner* — William R Harp
(74) *Attorney, Agent, or Firm* — Warner Norcross and Judd LLP

(57) ABSTRACT

A multi-row magnetic dial assembly that conveys work pieces, such as fasteners, includes a work piece engaging surface disposed around an outer perimeter, adjacent a first dial surface and/or adjacent a second dial surface. Multiple magnets are disposed adjacent the work piece engaging surface to exert a magnetic force on work pieces to magnetically hold them against a dial. The magnets include a first magnet and a second magnet that exert magnetic forces so that the work piece engaging surface magnetically attracts and holds first and second rows (or more) of work pieces, the first row being distal from the second row by a row separation distance. The dial can be oriented in a horizontal plane or a non-horizontal plane. Related methods of operation are also provided.

22 Claims, 16 Drawing Sheets

(51) Int. Cl.
*B65G 47/84* (2006.01)
*B05C 5/02* (2006.01)

(56) References Cited

U.S. PATENT DOCUMENTS

| | | | |
|---|---|---|---|
| 3,490,575 A | 1/1970 | Herrmann | |
| 3,637,065 A | 1/1972 | Ruscitti | |
| 3,831,736 A | 8/1974 | Barnes | |
| 3,894,509 A | 7/1975 | Duffy et al. | |
| 3,941,242 A | 3/1976 | Braden | |
| 3,991,704 A | 11/1976 | Hulstein et al. | |
| 4,046,106 A | 9/1977 | Bowman | |
| 4,082,058 A | 4/1978 | Dieme | |
| 4,155,327 A * | 5/1979 | Alexander et al. | B05C 5/0208 118/319 |
| 4,259,922 A | 4/1981 | Dieme | |
| 5,078,083 A * | 1/1992 | DiMaio et al. | B05B 7/1486 118/308 |
| 5,158,169 A | 10/1992 | Hardman | |
| 5,169,621 A * | 12/1992 | DiMaio et al. | B05B 7/1486 118/308 |
| 5,450,679 A * | 9/1995 | Mojden et al. | B65G 21/2018 198/345.1 |
| 5,607,720 A | 3/1997 | Wallace et al. | |
| 5,656,325 A | 8/1997 | Wallace | |
| 5,672,376 A | 9/1997 | Wallace | |
| 5,918,727 A | 7/1999 | Wallace et al. | |
| 5,928,711 A | 7/1999 | Wallace et al. | |
| 5,964,551 A | 10/1999 | Wallace | |
| 6,004,627 A * | 12/1999 | Duffy et al. | B05B 7/1445 118/319 |
| 6,027,568 A | 2/2000 | Wallace et al. | |
| 6,156,392 A * | 12/2000 | Duffy et al. | B05B 5/047 427/475 |
| 6,787,724 B2 | 9/2004 | Bennett et al. | |
| 2012/0315825 A1 | 12/2012 | Baccini et al. | |
| 2015/0298159 A1* | 10/2015 | Baumann | B05C 13/02 198/472.1 |

FOREIGN PATENT DOCUMENTS

| | | |
|---|---|---|
| JP | H0880469 | 3/1996 |
| JP | 2002346443 | 12/2002 |
| WO | 2010116805 A1 | 10/2010 |

OTHER PUBLICATIONS

Machine translation of EP2607273 from Espacenet, downloaded Nov. 20, 2014.

* cited by examiner

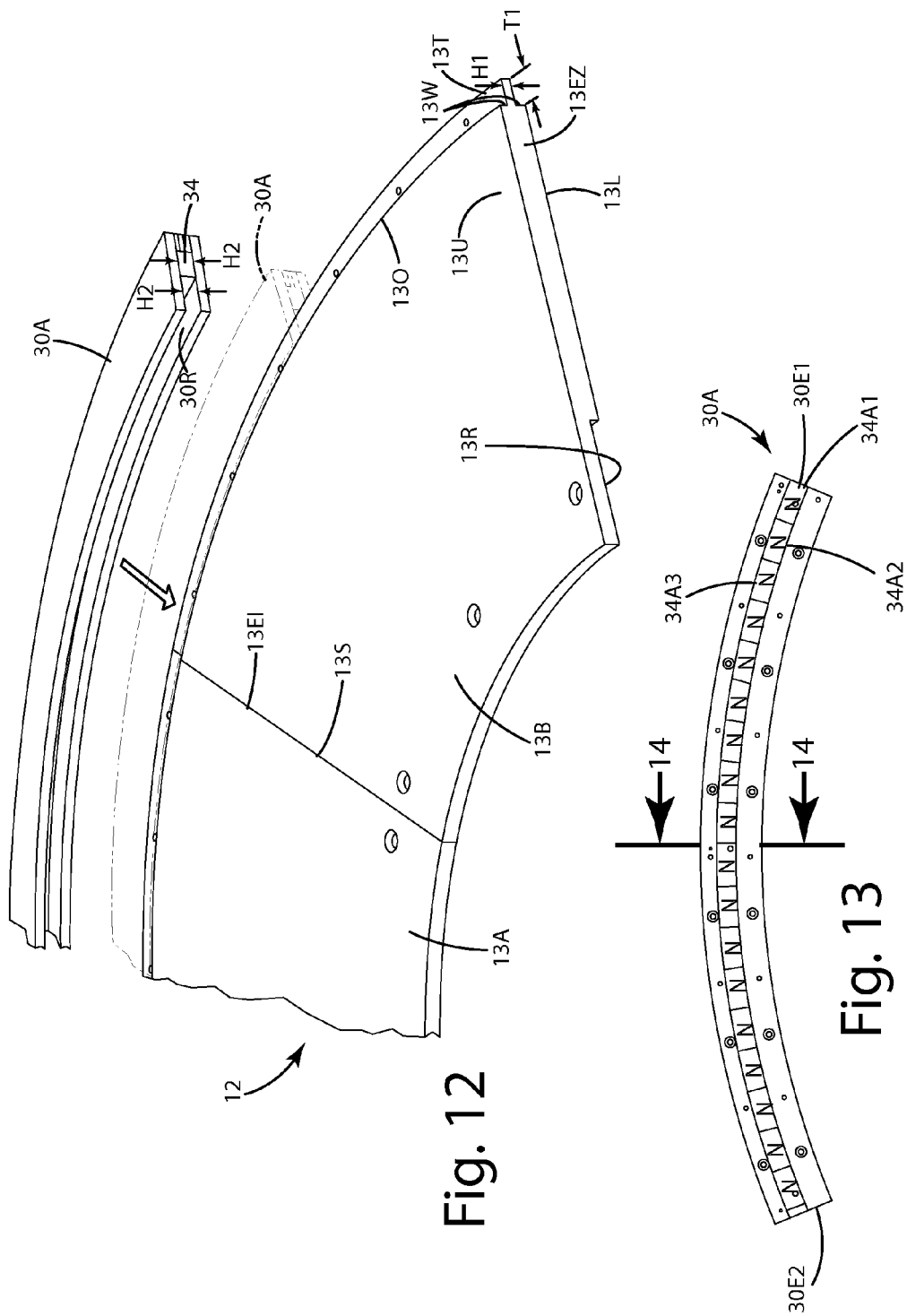

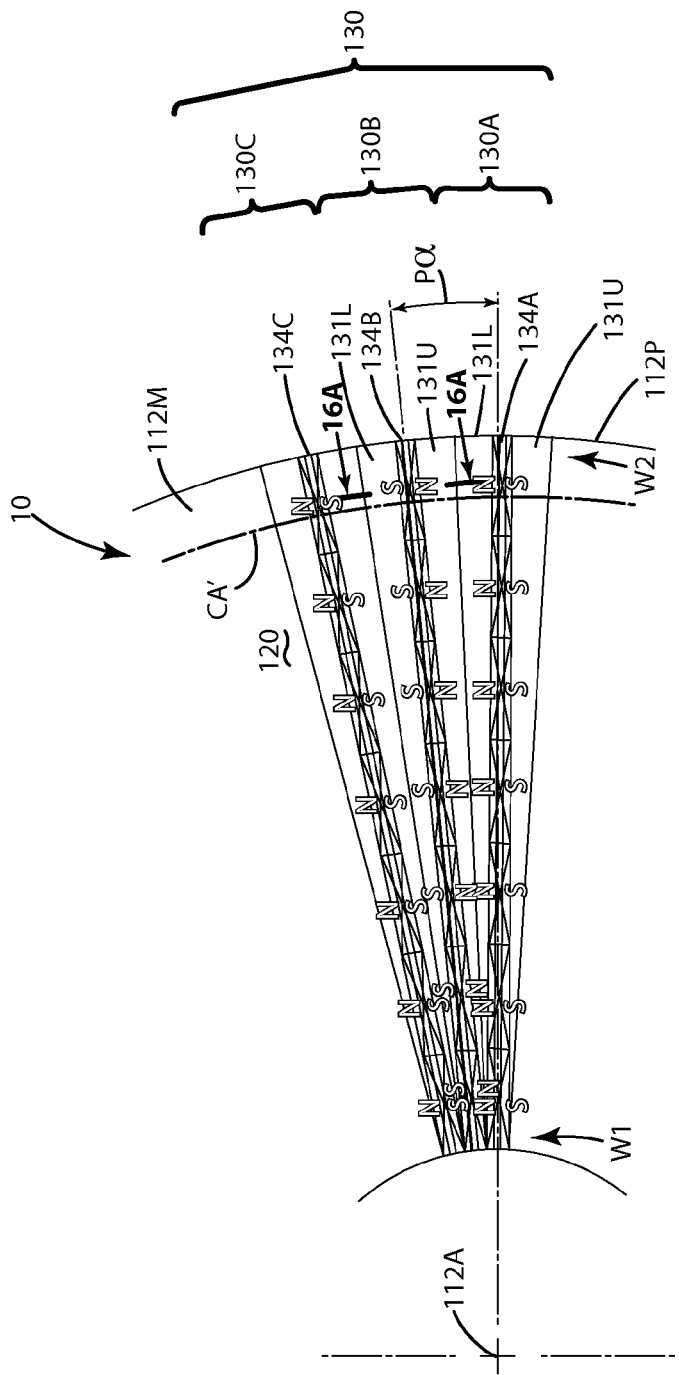
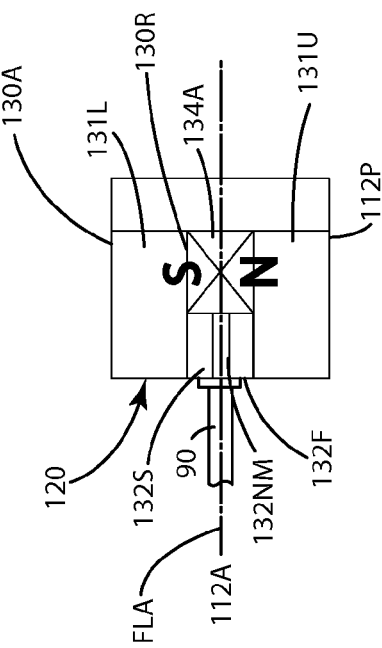
Fig. 16
Fig. 16A

MULTI-ROW MAGNETIC DIAL FOR THE CONVEYANCE OF WORKPIECES AND RELATED METHOD

BACKGROUND OF THE INVENTION

The present invention relates to devices for conveying work pieces, such as fasteners, and more particularly to a magnetic dial assembly that can be used in preparation and finishing processes, to increase the linear travel distance of work pieces while being processed.

There are a variety of devices that process work pieces. Certain conventional devices apply materials to the work pieces. As an example, some devices apply thread locking material to the threads of fasteners. Such devices can include a horizontally oriented dial. A motor rotates the dial. The dial also includes an outer perimeter extending around it, where fasteners are temporarily held in a single row for application of the threadlock material.

To temporarily hold the fasteners against the outer perimeter, the outer perimeter includes magnets. The magnets are oriented relative to the dial so that the north and south poles of the magnets are aligned in a consistent north-south relationship. Specifically, where multiple bar magnets are used, the bar magnets are oriented so that all north poles of all the magnets are oriented toward an upper face of the dial, and all south poles of all the magnets are oriented toward the lower face of the dial.

In these conventional dial devices, the magnets are disposed within a single housing having two opposing covers constructed from a magnetic material that permits passage of the magnetic fields therethrough. An area of magnetic concentration is centralized over the insulating member, and this is where fasteners align in a single row about the outer perimeter.

As a result of the magnets being disposed only in a single plane, conventional dials convey only a single row of fasteners. Thus, as the dial rotates, there is only one level or row of fasteners being conveyed around it. In turn, where the fasteners are processed on the dial at a station, they typically only achieve a single pass by the station. As an example, where a thread locking agent is applied to threads of fasteners in a single row on the dial, the fasteners with applied thread locking agent pass a heating station. However, the fastener only passes the heating station a single time when the dial only rotates one time. If additional drying is required, the dial can no longer be loaded with additional fasteners, and the single row of fasteners about the outer perimeter of the dial must be rotated multiple times about the axis to further heat and cure the thread locking agent at the heating station. As a result, the linear processing length achieved by these conventional dial type conveyance devices is usually limited to the outer circumference of the dial.

Conventional conveyance devices, such as dials, can have other issues. As an example, when the workpieces, such as fasteners, are removed from the single row on the outer perimeter of the dial, the removed fasteners can daisy chain to one another due to the magnetic field being conveyed there through. This leads to disorderly takeoff of the fasteners. Further, in some cases, the fasteners reattach to the dial on its lower surface after being taken off due to the magnetic pull of the dial. The above disorderly takeoffs and other workpiece misalignments can result in damage to portions of the processed fasteners and/or improper takeoff and transfer to subsequent work stations.

There remains room for improvement with regard to conveyance devices for machines that process workpieces, such as fasteners, particularly with regard to dials included in such machines.

SUMMARY OF THE INVENTION

A multi-row magnetic dial assembly configured for the conveyance of work pieces, such as fasteners, is provided. The dial assembly includes a work piece engaging surface disposed around an outer dial perimeter, adjacent a first dial surface and/or adjacent a second dial surface. Multiple magnets are disposed adjacent the work piece engaging surface to exert a magnetic force on work pieces to magnetically hold them against the dial. The magnets can include a first magnet and a second magnet placed adjacent one another and in magnetic communication with the work piece engaging surface. A first north pole of the first magnet can be positioned adjacent and facing a second north pole of the second magnet to exert a repulsive force between the first and second magnet. The first and second magnets each respectively focus magnetic force adjacent themselves and the work piece engaging surface so that the work piece engaging surface magnetically attracts and holds a first row of work pieces adjacent the first magnet and a second row of work pieces adjacent the second magnet, where the first row is distal from the second row. In effect, the dial assembly can convey multiple rows of work pieces about its outer dial perimeter.

In one embodiment, the conveyance device includes a feed station that feeds fasteners toward the dial, orienting the fasteners so that their longitudinal axes are generally perpendicular to the work piece engaging surface. The dial assembly moves the fasteners in a first row past a processing station where, for example, a material can be applied to the work pieces. The material can be any thread locking compound, sealant, adhesive, lubricant, and can be in liquid and/or powder form.

In another embodiment, the dial assembly can be placed adjacent or can include an inspection station that inspects fasteners. Based on the outcome of the inspection, conforming and non-conforming parts can be adequately processed or discarded.

In still another embodiment, the dial assembly can include one or more diverters. The diverters can be placed adjacent the work piece engaging surface to transition and/or divert fasteners being conveyed a first row to a second row, distal from the first row. Optionally, the dial assembly can also include a takeoff diverter. The takeoff diverter can take off or otherwise remove work pieces from the work piece engaging surface for subsequent transport and/or processing.

In yet another embodiment, the dial assembly can include multiple magnetic modules stacked one atop the other. The modules can be positioned so that the first magnet is located generally below the second magnet. The north pole of the first magnet can face upward and the sole pole of that magnet can face downward. The north pole of the second magnet can face downward and the south pole of the second magnet can face upward. Additional modules of magnets can be stacked and connected in layers above the second magnetic module. As an example, a third module having a downward facing south pole and an upward facing north pole can be placed above the second magnetic module.

In even another embodiment, the dial can be oriented so that it rotates about a substantially vertical axis, generally in a horizontal plane. The magnets and/or magnetic modules can be positioned along an outer dial perimeter of the dial. The work piece engaging surface can generally convey multiple rows of fasteners, one row above another around the outer dial perimeter to expose the fasteners to various processing stations.

In a further embodiment, the dial assembly can be positioned with the dial in a dial plane that is non-horizontal, for example, vertical. With this construction, the dial axis can be non-vertical, for example, horizontal. The work piece engaging surface can be disposed along an upper or lower surface of the dial, rather than about outer dial perimeter. Multiple magnetic module "wedges" or "slices" can be disposed adjacent one another and oriented around the dial axis. In some cases, the magnetic module wedges can extend radially outward from the dial axis. These wedges or slices can be oriented around any given circular path about the dial axis. Adjacent magnetic module wedges can include first and second magnets oriented within their magnetic poles in a north-south, south-north, north-south, south-north orientation. The work piece engaging surface of this dial assembly can orient fasteners in multiple rows that generally are aligned with multiple different circular paths extending at least partially around the dial axis. Optionally, the dial and modules can orient the work pieces, for example, fasteners, in a first circular path and in a second circular path, which are generally concentric with one another, and optionally additional circular paths depending on the application.

In still a further embodiment, the dial assembly can include first and second magnetic modules, each with first and second housings defining first and second module recesses respectively. First and second magnets can be disposed in the first and second module recesses. The first magnetic module housing can include a first magnetic member and a first non-magnetic member, for example, a magnetic field. The first non-magnetic member can be located between the first magnet and a work piece engaging surface of the dial assembly. Likewise a second magnetic module can include a second non-magnetic module disposed between the second magnet and the work piece engaging surface. With these constructions, a magnetic field is optionally concentrated near the non-magnetic member and the work piece engaging surface so that work pieces or fasteners are attracted to the work piece engaging surface adjacent or on the non-magnetic members. Accordingly, where there are multiple non-magnetic members, different rows separated by a distance of the magnetic work pieces can be oriented along the non-magnetic members.

In yet another embodiment, the dial assembly can include a primary dial member having an outer dial perimeter at which a connector tongue is located. Optionally, the primary dial member is segmented into multiple segments placed one adjacent the other. These segments can be in the form of arcuate segments joined at one or more seams.

In even another embodiment, the dial assembly can include one or more magnetic modules. The modules can each include a housing, which can define a connector recess. The magnetic module can be secured to the primary dial member by placing the connector tongue within the connector recess and optionally securing the module to the primary dial member with one or more fasteners. Multiple additional magnetic module levels or layers can be stacked atop a first magnetic module level, which that is joined directly with the primary dial member. Optionally, two, three, four, five, six or more magnetic module levels or layers can be included in the dial assembly. In turn, the dial assembly can provide the same number of rows of work pieces along the work piece engaging surface. For example, with three magnetic module levels, the work piece engaging surface can hold three rows of magnets about an outer dial perimeter along a work piece engaging surface.

In another, further embodiment a method for processing multiple work pieces is provided. The method can include providing a feed station; magnetically attracting the fasteners toward a work piece engaging surface of a dial assembly so that longitudinal axes of the work pieces project generally perpendicular to the work piece engaging surface; rotating the dial assembly so that the fasteners move around a dial axis in a first row about at least a portion of an outer dial perimeter; diverting fasteners from the first row into a second row being located distal from the first row; and removing the fasteners from the dial assembly. Optionally, the work pieces can be fasteners and a material can be applied to the fasteners as they move about the dial axis. Further optionally, heat can be applied to the fasteners to heat and/or cure the material.

In still another, further embodiment, a method is provided for applying material to the work piece such as a fastener. This method can include: providing a dial in a non-horizontal plane, the dial including a work piece engaging surface generally parallel to the non-horizontal plane; providing magnetic fields adjacent the work piece engaging surface to magnetically hold fasteners adjacent the work piece engaging surface so that longitudinal axes of the fasteners are generally perpendicular to the non-horizontal plane; and rotating the dial in the non-horizontal plane.

In yet another, further embodiment, the fastener can be moved past an application station at which material is applied to the fastener. Optionally, the material can be liquid and/or can become liquid. The material, when liquid, can flow around the outer circumference of the fastener in a predetermined location as the fastener travels around the dial axis in a generally circular path.

The present invention provides a conveyance device, such as a dial assembly for a machine, that increases the number of rows of work pieces conveyed and processed by the machine. With multiple rows of work pieces being conveyed by the device, the device can double, triple, quadruple or increase by other multiples, the linear carrying distance of the work pieces through the machine. With this construction, the device can decrease the total amount of floor space occupied by other conveyance devices. Further, the device can increase the dwell time for fasteners temporarily carried by the device for further processing, such as heating, curing, blowing, cooling, application of UV light or other processing steps. In addition, where the dial is oriented in a non-horizontal or generally vertical configuration, multiple devices can be compressed into a much smaller footprint in a manufacturing facility. This can provide enhanced efficiencies and reduce overhead substantially for users of the conveyance device described herein.

These and other objects, advantages, and features of the invention will be more fully understood and appreciated by reference to the description of the current embodiment and the drawings.

Before the embodiments are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 12 is a perspective view of a partially constructed primary dial member having a magnetic module being attached thereto;

FIG. 13 is a top view of an exemplary magnetic module of the dial assembly;

FIG. 16 is a close-up view of multiple magnetic module wedges or slices associated with the dial assembly of the first alternative embodiment;

FIG. 16A is a section view of a magnetic module wedge taken along lines 16A-16A of FIG. 16;

DETAILED DESCRIPTION OF THE CURRENT EMBODIMENTS

I. Overview

Figure 1:
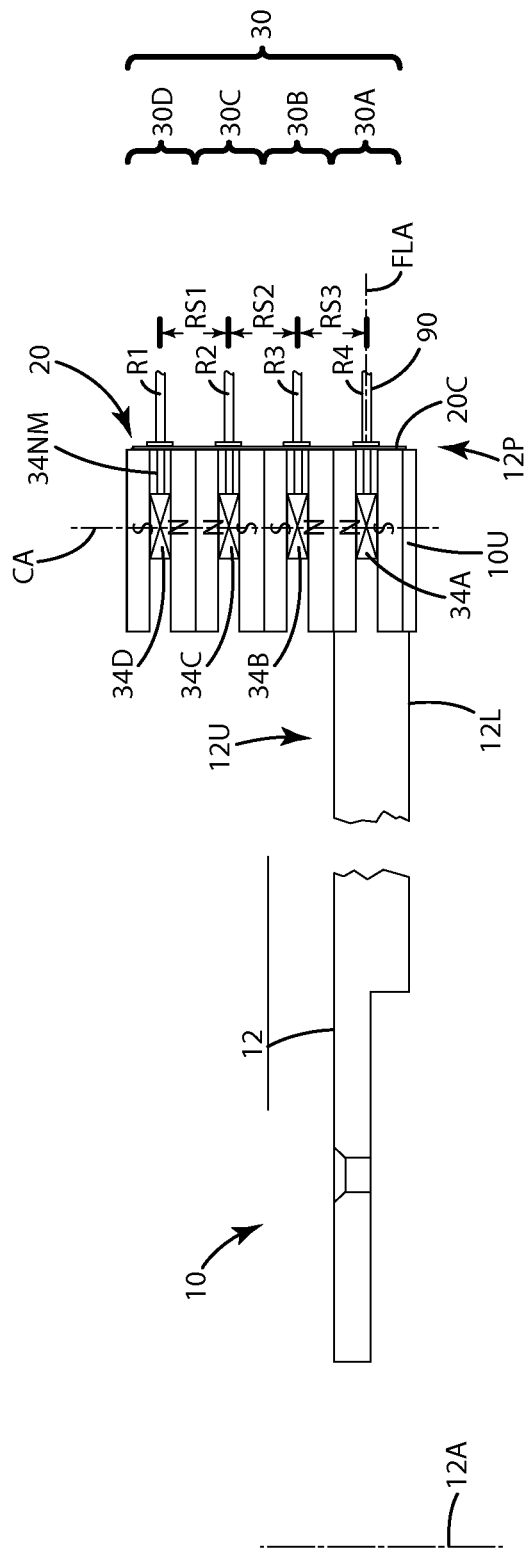
FIG. 1 is a partial sectional view of a conveyance device in the form of a dial assembly of the current embodiment.

A machine including a conveyance device of the current embodiment is illustrated in FIGS. 1-5 and generally designated 1. The conveyance device can be in the form of a dial assembly 10. The dial assembly can include a primary dial member 12, which as illustrated herein, can be in the form of a circular planar member having an upper surface 12U and an opposing lower surface 12L. The dial assembly 110 also can include an outer dial perimeter 12P oriented around the outer most edge of the dial assembly. The dial assembly 110 also can include a work piece engaging surface 20 which extends around the outer dial perimeter 12P. Of course, this surface 20 can be located on the upper, lower and/or other surfaces as described in other embodiments below.

The dial assembly generally rotates about a dial axis 12A, and accordingly, the work piece engaging surface 20 also rotates about that dial axis 12A. The dial assembly can include multiple magnetic modules 30 disposed in a stacked relationship in various levels or layers around the outer dial perimeter 12P. The modules can include magnets 34A, 34B, 34C stacked or generally positioned one above the other in separate levels or layers about the outer dial perimeter. The magnets are near the work piece engaging surface 20 so that they exert a magnetic force at the work piece engaging surface to attract work pieces, for example, fasteners, thereagainst. The magnets are specially oriented, with their pulls in a particular orientation so as to create multiple magnetic fields that attract work pieces and hold work pieces in two or more rows separated by a row separation distance RS1, RS2, RS3 about the outer dial perimeter 12P as the dial assembly and primary dial member 12 rotate. With this construction, and the multiple rows providing for conveyance of the fasteners on the dial assembly, the current embodiments can provide increased transit times and can reduce misalignment of the work pieces during transit and/or take off. The dial assembly also can include one or more diverters 30 which can divert fasteners from a first row to a second different which is separated from the first row by a row separation distance.

The dial assembly 10 can be placed adjacent one or more other components of the machine 1. For example, the dial assembly 10 can be placed adjacent a feed station 2 feeds work pieces 90 in a particular orientation toward the work piece engaging surface 20. The machine 1 can also include a processing station 4 that does something to the work pieces, for example, coats, paints or covers them using a particular type of applicator. The machine also can include a secondary component, for example, a heating helmet 6 that can apply heat to the fasteners after undergoing processing in the processing station 4. This in turn, can cure or otherwise better secure the materials that were applied in the processing station. The machine 1 also can include an inspection station 8 including a camera or other sensor that senses, images and/or detects work pieces to ensure that they are appropriately processed. As a result, the inspection station 8 can send signals to a controller 9 which can address conforming or non-conforming parts.

In general, the dial assembly herein, and respective magnetic modules, can simultaneously transport multiple rows of work pieces, such as fasteners there along. It has been discovered to significantly increase the linear transit distance of the dial assembly. For example, where three layers or levels of magnetic modules are stacked upon each other vertically about the outer dial perimeter 12P, the linear distance transport of the work pieces is increased to three times that of a dial assembly including only one layer or level of magnetic modules. With four stacked layers of the magnetic modules about the outer dial perimeter 12P, the assembly increases the linear transport distance of the fasteners to four times that of a single level dial member, and so on. As will be appreciated, the number of layers or levels of magnetic modules stacked upon one another can generally dictate the increase in linear transport distance of work pieces about the dial assembly as it rotates. Further, it is contemplated that any number of stacked levels and corresponding rows can be implemented with the dial assembly herein. For example, if a coated fastener needs to travel a significant distance through a heater to cure the material disposed on the fastener, the number of magnetic modules stacked upon one another and in layers or levels can be increased to a corresponding number. This can dramatically decrease the overall amount of floor space used for secondary steps such as curing, drying, applying heat and the like.

II. Construction and Components

The construction and components of the dial assembly 10 will now be described in more detail. To begin, the machine 1 with which the dial assembly 10 can be utilized is illustrated in FIGS. 3-6. The machine 1 can include a feed station 2, a processing station 4, a heating station 6, and an inspection station 8, all adjacent the dial assembly 10. These stations and the dial assembly can be in communication with and/or operated by a controller 9.

Figure 6:
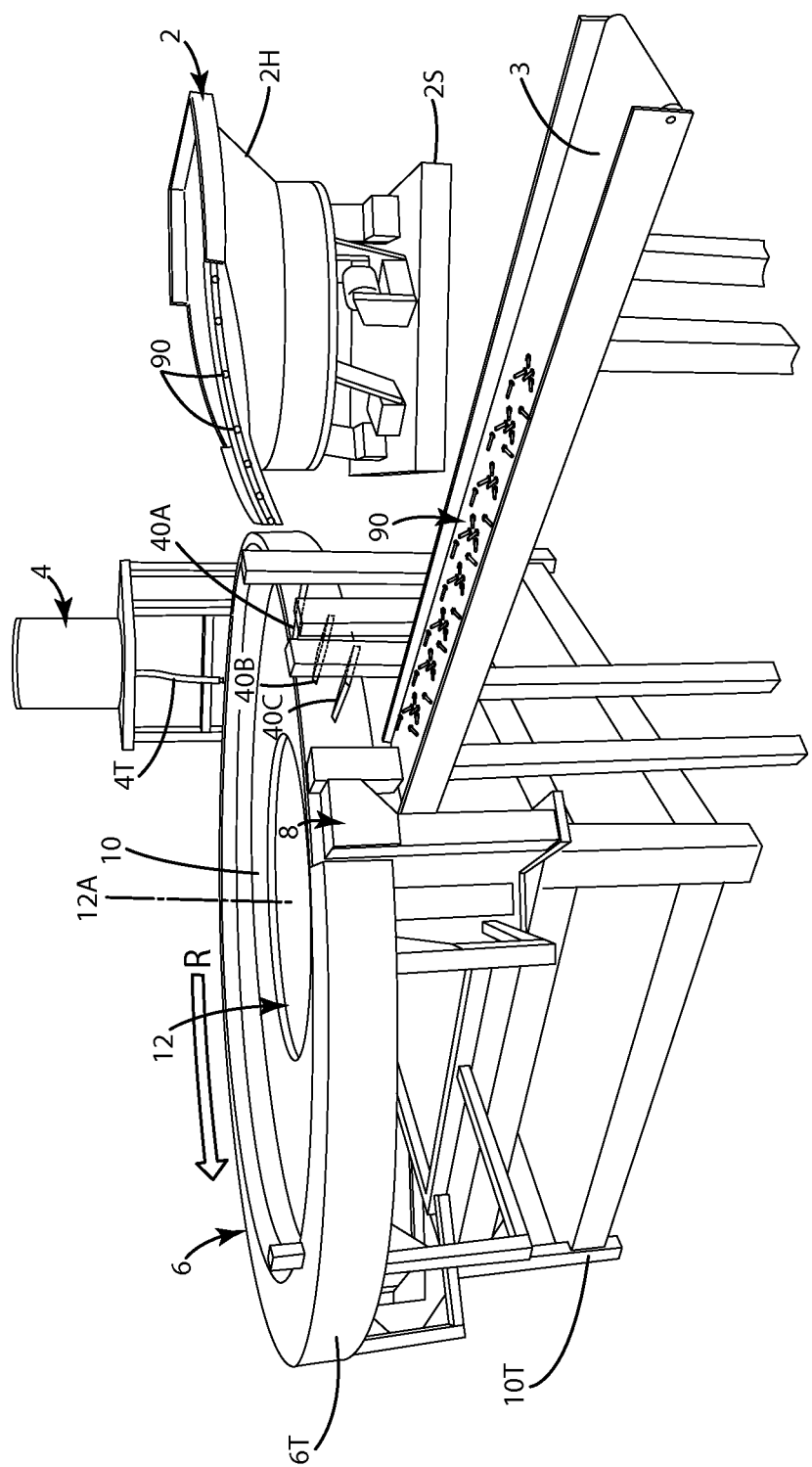
FIG. 6 is another perspective view of the machine illustrating a secondary conveyor, a hopper, and an applicator.
Figure 8:
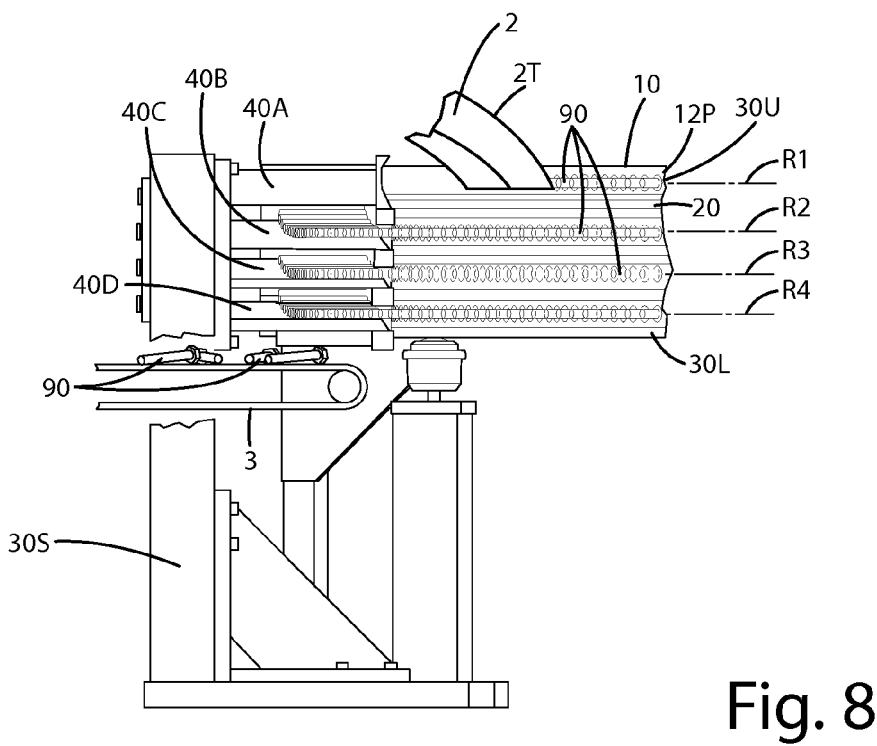
FIG. 8 is a side view of multiple rows of work pieces being diverted by the diverters of the dial assembly, and subsequently ejected onto a secondary conveyor.

As shown in FIGS. 1 and 6, the feed station 2 can be placed adjacent the dial assembly 10 so that a plurality of work pieces 90, such as fasteners, can be selectively placed adjacent the dial assembly and magnetically attracted to and held on the work piece engaging surface 20. The feed station 2 can include a feed station stand 2S and a hopper 2H. Within the hopper, fasteners can be loaded and randomly oriented. The feed station 2 can include an orientor 2O. The orientor 2O can include a track 2T that feeds the fasteners toward the dial assembly 10, generally orienting them so that their longitudinal axes FLA are perpendicular to the work piece engaging surface 20 as described further below. The feed station 2 and in particular the hopper 2H can be connected to a vibratory drive to vibrate the fasteners within the hopper, delivering them to the orientor 2O and ultimately to the track 2T. From the track 2T of the feed station 2, the fasteners are sequentially fed to the dial assembly 10 and in particular the work piece engaging surface 20 around the outer dial perimeter 12P. Optionally, the track 2T as shown in FIG. 8 can be positioned adjacent the uppermost magnetic module 30D to deposit the fasteners adjacent the work piece engaging surface 20 generally at the uppermost portion 30U or height of the dial assembly 10.

The spacing of the track 2T is established so that it can accommodate the shaft and/or threads of the screw protruding therethrough, with the head of the fastener riding along an upper surface of the track 2T. Generally, the dial assembly 10 rotates and the fasteners 90 are fed through the orientor 2O and track 2T. The magnetic modules 30 magnetically attract the fasteners head first and one by one toward the work piece engaging surface 20. After the magnetic attraction, the fasteners are held in place via a magnetic force and rotate with the dial assembly 10 in row R1.

Figure 2:
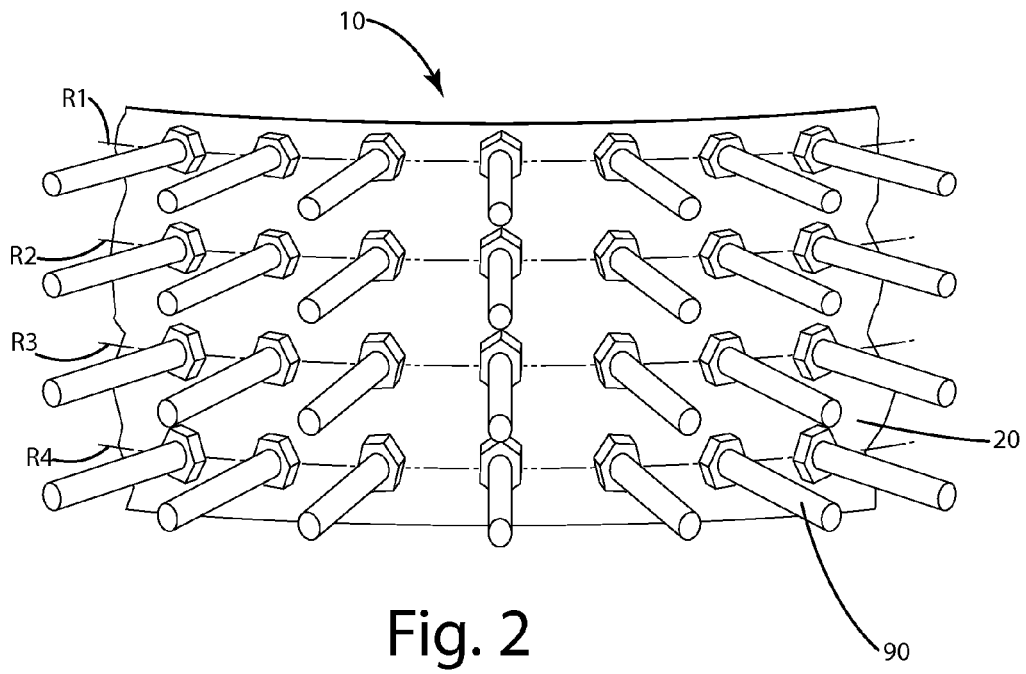
FIG. 2 is a perspective view of multiple rows of work pieces being conveyed on the dial assembly.
Figure 2A:
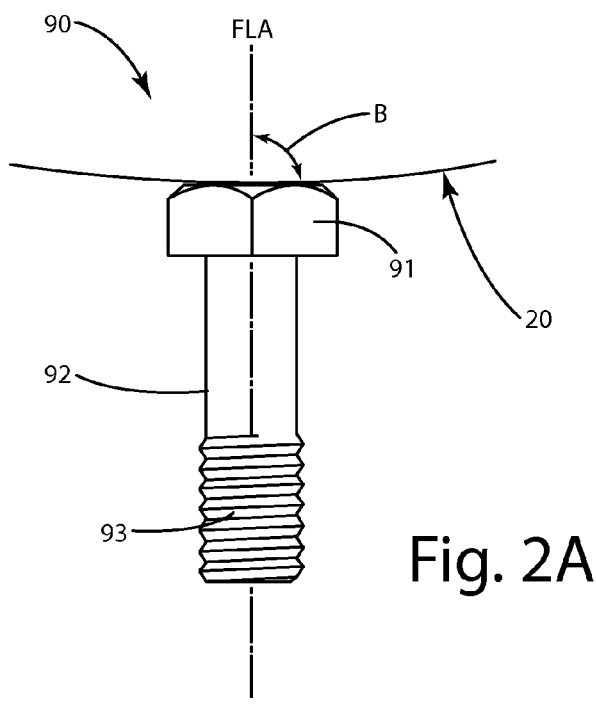
FIG. 2A is a perspective view of an elongated work piece, such as a fastener, that can be conveyed with the dial assembly of the current embodiments.

An example of a work piece 90, optionally in the form of an elongated work piece, such as a fastener 90, that can be used in conjunction with the current embodiments is illustrated in FIG. 2A. There, the fastener 90 includes a shank or shaft 92 provided with an external thread 93 and an enlarged head 91. Of course, the work piece can take other forms, such as headless screws, threaded shanks without heads and the like. Typically, with the current embodiments, a material is applied to the external thread. The material can cover a preselected area on the thread surface and can be spaced at a preselected location continuously around the thread and shaft, in some cases, optionally circumferentiating the thread around the longitudinal axis FLA of the fastener. The fastener 90 can be constructed from a magnetic material, for example, steel or iron, so that it is attracted by the magnetic modules of the dial assembly.

Optionally, the feed station 2 feeds the fasteners 90 to the work piece engaging surface 20 so that the fasteners are oriented generally perpendicular to the work piece engaging surface 20. This is also shown in FIG. 2A. There, the fastener longitudinal axis FLA is generally oriented at an angle B which can be about 90° or perpendicular to the work piece engaging surface. Of course, depending on the uppermost surface of the enlarged head 91, the fastener longitudinal axis FLA can be slightly offset from perfectly perpendicular, but for purposes of herein, even with such a minor offset, the fastener longitudinal axis FLA is still considered generally perpendicular to the work piece engaging surface 20.

Generally, the feed station 2 delivers a constant succession of fasteners 90 to the dial assembly 12 until the fasteners 90 substantially fill the outer dial perimeter 12P of the dial from the feed station all the way around the dial assembly 12 multiple times in multiple rows R1, R2, R3, R4. With multiple revolutions of the dial assembly 10, the fasteners 90 can be initially deposited at the uppermost portion 30U of the work piece engaging surface 20 and eventually transition through the rows R1, R2, R3, R4 with the assistance of the multiple diverters to a lower portion 30L of the dial assembly 10. Optionally, although not shown, in some applications multiple feed stations 2 can be disposed adjacent the dial assembly to deliver multiple successions of fasteners to the work piece engaging surface 20 of the dial assembly 10.

Another component of the machine 1 which can be associated with the dial assembly can be a processing station 4. Again, the processing system can generally do something to the work pieces, such as apply a material to it. The processing station 4 can be in the form of an applicator that applies material to the fasteners as they pass by the applicator 4. This is illustrated with reference to FIGS. 4, 5 and 11. The material can be in the form of a threadlock, sealant, plug, adhesive, lubricants and the like. Typically the material, can be in a liquid or gel form, but of course can be in the form of a solid, such as a powder, that is applied to the surfaces of the fasteners 90 as they pass by the applicator 4.

Figure 11:
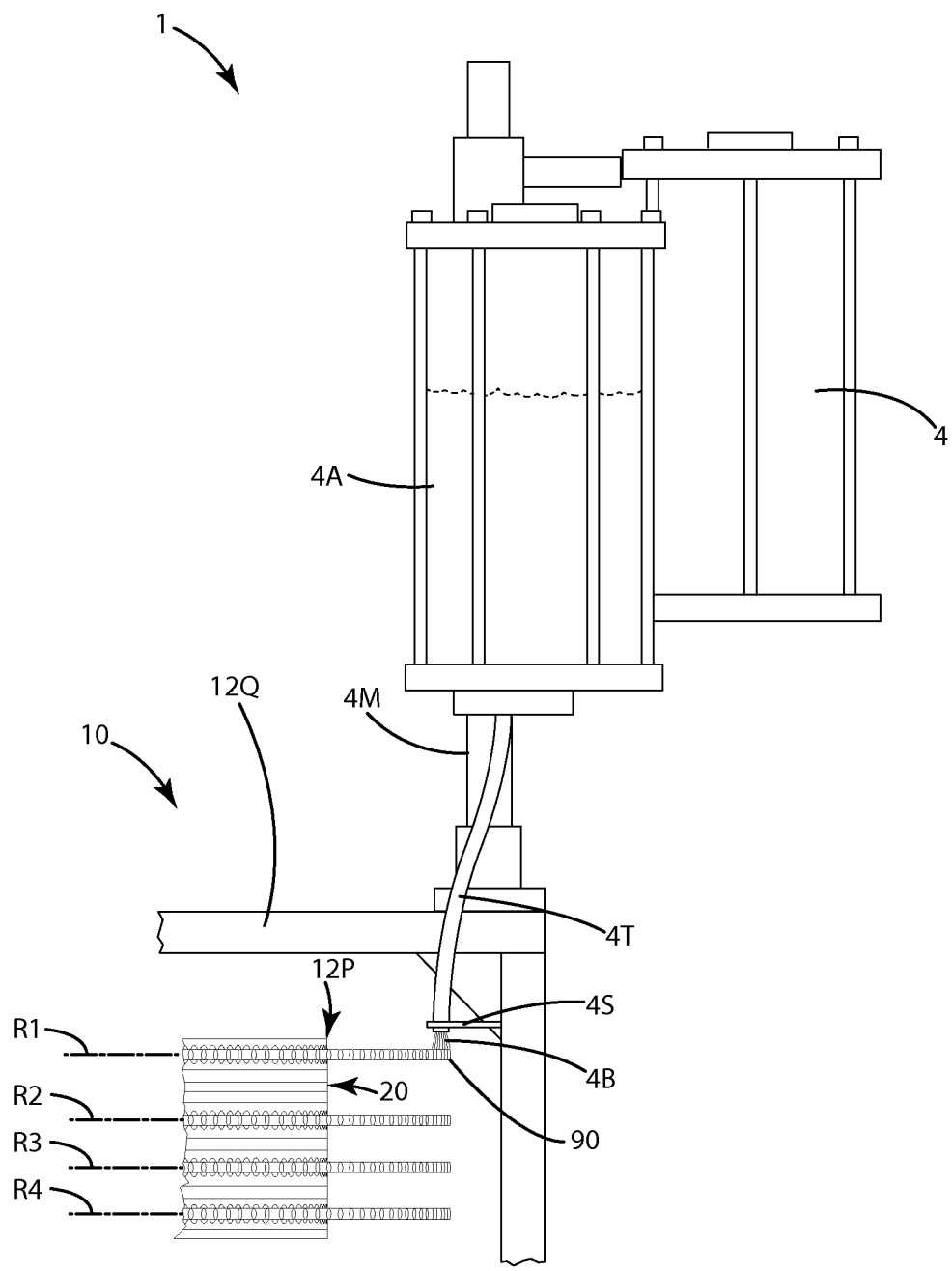
FIG. 11 is a partial view of the dial assembly adjacent an application station.

The applicator can include a tube 4T that extends and is supported by a support 4S adjacent a specific row of fasteners on the work piece engaging surface 20. As illustrated by FIG. 11, the tube 4T extends from the applicator tank 4A which is mounted to a support trunk 4M. By gravity and/or under pressure, material in liquid form can be pumped or drained through the tube 4T to an applicator brush 4B. The tube 4T and/or applicator brush 4B can be supported with the support 4S in a predetermined location adjacent the outer perimeter 12P of the dial and generally adjacent the work piece engaging surface 20. As illustrated in FIG. 11, the applicator brush 4B is mounted in a position so that its bristles will engage or come close to engaging fasteners 90 in the first row R1 of the fasteners magnetically attracted to the work piece engaging surface 20. The upper row works well for applying material to the threads of the fasteners 90 because as the fasteners progress down the work piece engaging surface 20, they become more difficult to access. For example, access to the rows R3 and R4 can sometimes require a substantially reduced dimension brush or applicator portion. Of course, in some instances this can be addressed by simply spacing the rows R1, R2, R3 and R4, etc. farther from one another as they traverse around the dial while the dial rotates.

Although shown as a brush 4B, the applicator can optionally include some other type of applicator such as a nozzle that can spray material directly onto portions of the fasteners 90. Further optionally, the brush can be replaced with a roller, which can be saturated or include material on its surface so that as the fasteners 90 pass by it, the engaged surface can roll on the material. As desired the brush 4B or other components can be stationary or they can move with the fasteners as they traverse around a portion of an arc as the dial assembly 10 rotates about the dial axis 12A. The brush 4B can apply the material to one or more surfaces of the fasteners 90. Optionally, the material can be applied directly to the threads. Where there are holes or other indentations or recesses, the materials can be applied thereto. In some cases, where the fasteners 90 do not include any threads, the applicator 4 can simply apply the material in any desired orientation along the shaft and/or head of the fastener or other work piece.

If desired, there can be multiple processing stations disposed around different portions of the outer dial perimeter 12P. These application stations can apply different layers of material or can apply different types of materials that can react with one another on the surface of the thread as the fasteners traverse around the dial axis on the dial assembly 10.

The machine 1 also can include a controller 9 as mentioned above. This controller can be in communication with the applicator to control the rate at which material is delivered through the tube 4T to the brush 4B and ultimately to the fasteners 90. In addition, the controller 9 can be in communication with the feed station 2 to monitor the rate and status of the feed from the feed station 2. Where included, an inspection station 8 can be in communication with the controller as well as the secondary components, such as the heater 6. Likewise the motor 14M that rotates the dial assembly 10 also can be in communication and controlled by the controller 9. Optionally, the controller can include a microprocessor, computer or other device capable of operating and synchronizing the various components of the machine 1.

As mentioned above, the machine 1 can include a secondary component such as a heater 6. The heater can be in the form of an induction heater, a convection heater, or an infrared heater. The heater 6 can include a tunnel 6T that extends around a portion of the outer dial perimeter 12P. The tunnel 6T can include an upper wall 6U and a lower wall 6L. The tunnel 6T can be subdivided into subtunnels 6A, 6B, 6C and 6D. Each of these tunnels can accommodate respective first, second, third and fourth rows R1, R2, R3 and R4. Of course, if desired these subtunnels can be combined in a single chambered tunnel. The tunnel 6T generally includes an upper wall 6U that extends upwardly and above the upwardmost surface of the uppermost magnetic module 30U. This wall transitions to a side wall 6S which extends and is generally parallel to the work piece engaging surface 20. The side wall 6S can transition to a lower wall 6U that can continue inwardly toward the dial axis 12A, similar to the upper wall 6U. The tunnel 6T can extend around the dial assembly 10 a preselected amount. For example, the tunnel can include an entrance 6E and an exit 6I. The entrance and exit can be located generally on opposite sides of the dial, opposite one another across the dial axis 12. Optionally, the tunnel 6T can extend through a predetermined tunnel angle Hα, around the circumference of the dial assembly 10, and/or through an arc about the dial axis 12A. This angle Hα can be optionally about 0° to about 270°, further optionally about 0° to about 180°, and even further optionally about 45° to about 180°. Of course, the precise location and size of the tunnel can vary depending on the desired operation of the secondary component.

The heater 6 can include a specific heating element and optionally a fan or blower that blows heated air through the tunnel and over the fasteners in the rows R1-R4. The heater can be located adjacent the work piece engaging surface 20 and/or the rows R1-R4 of fasteners. The heater can be also optionally located downstream of the processing station 4 so whatever material is applied to work pieces at the processing station can be heated through the heating tunnel 6T.

The heating tunnel 6T can apply heat for a first preselected period to the first row R1. After the first row R1 is transitioned to form the second row R2, the heater 6 can apply heat for a second preselected period to the new second row. The first and second preselected heating periods can be substantially equal as the rows generally traverse about the dial axis 12A at an equal rate. In this manner, the fasteners can be heated twice, once in the first row R1 and once in the second row R2, and multiple more times in additional rows R3, R4, etc. As mentioned above, the heat tunnel 6T can be constructed so that all rows of fasteners conveyed around the outer dial perimeter can simultaneously be disposed in the tunnel along certain portions of the row length. Alternatively, the tunnel can be separated into different sections so that the first row is in the tunnel for a first amount of time, the second row is in another portion of the tunnel for another preselected period different from the first, and so on.

Although described in connection with a heater, the secondary component can be some other device capable of affecting the fasteners 90. For example, secondary component can be a cooler, a UV light applicator, a visible light applicator, an oven, a tunnel where gas is applied to the fasteners, or any other processing component that can modify the fasteners or the material applied to the fasteners.

Figure 4:
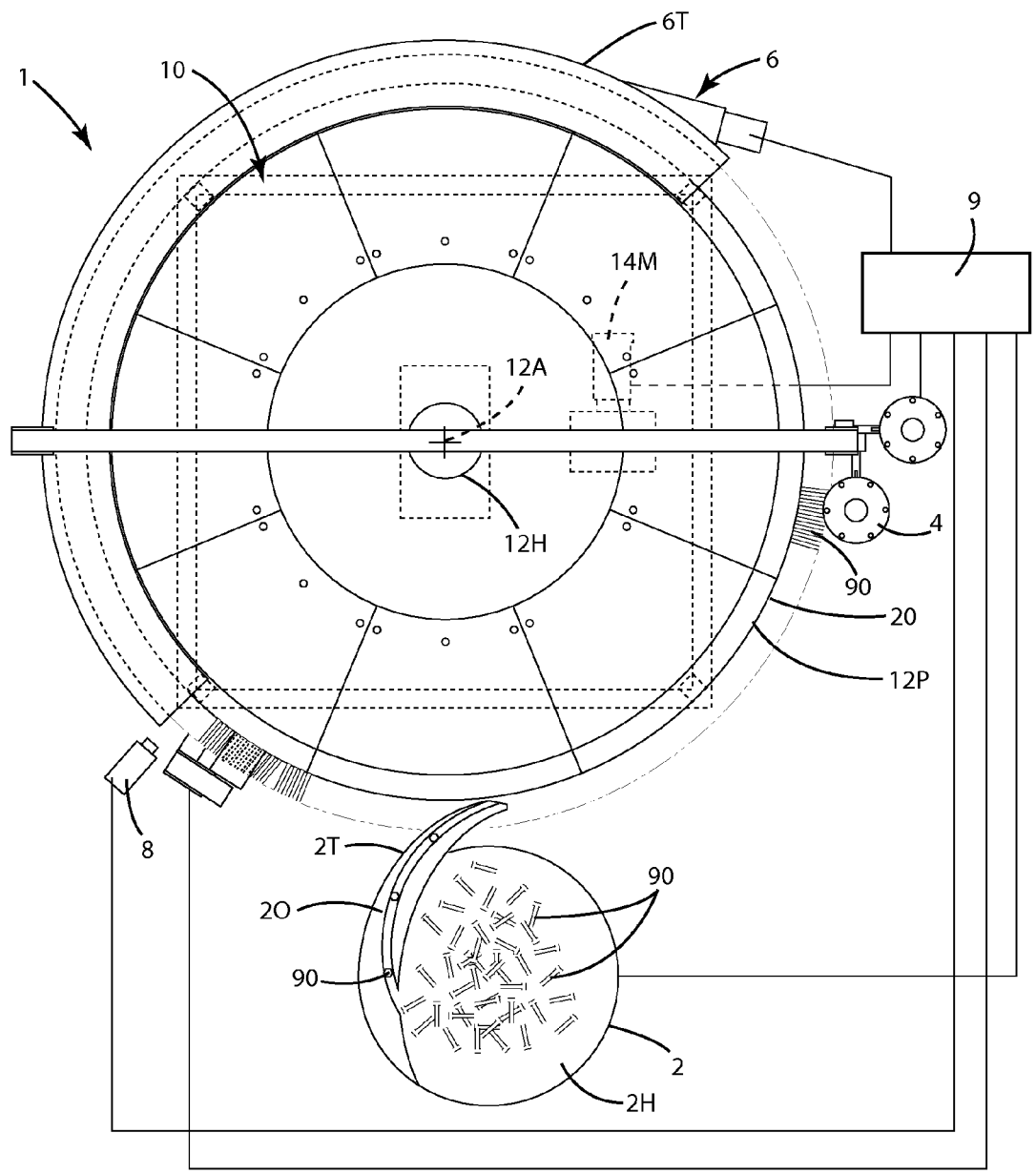
FIG. 4 is a top view of the dial assembly included in the machine.
Figure 9:
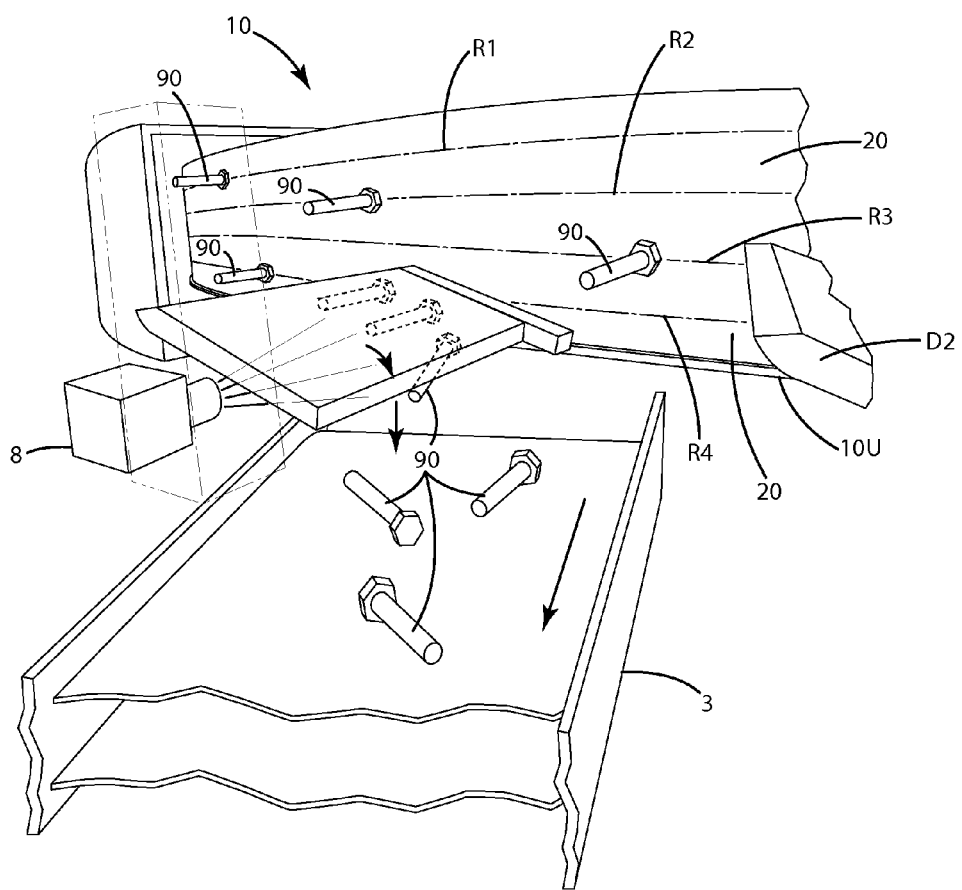
FIG. 9 is a close-up view of a final row of work pieces being ejected onto a secondary conveyor after passing an inspection station.
Figure 10:
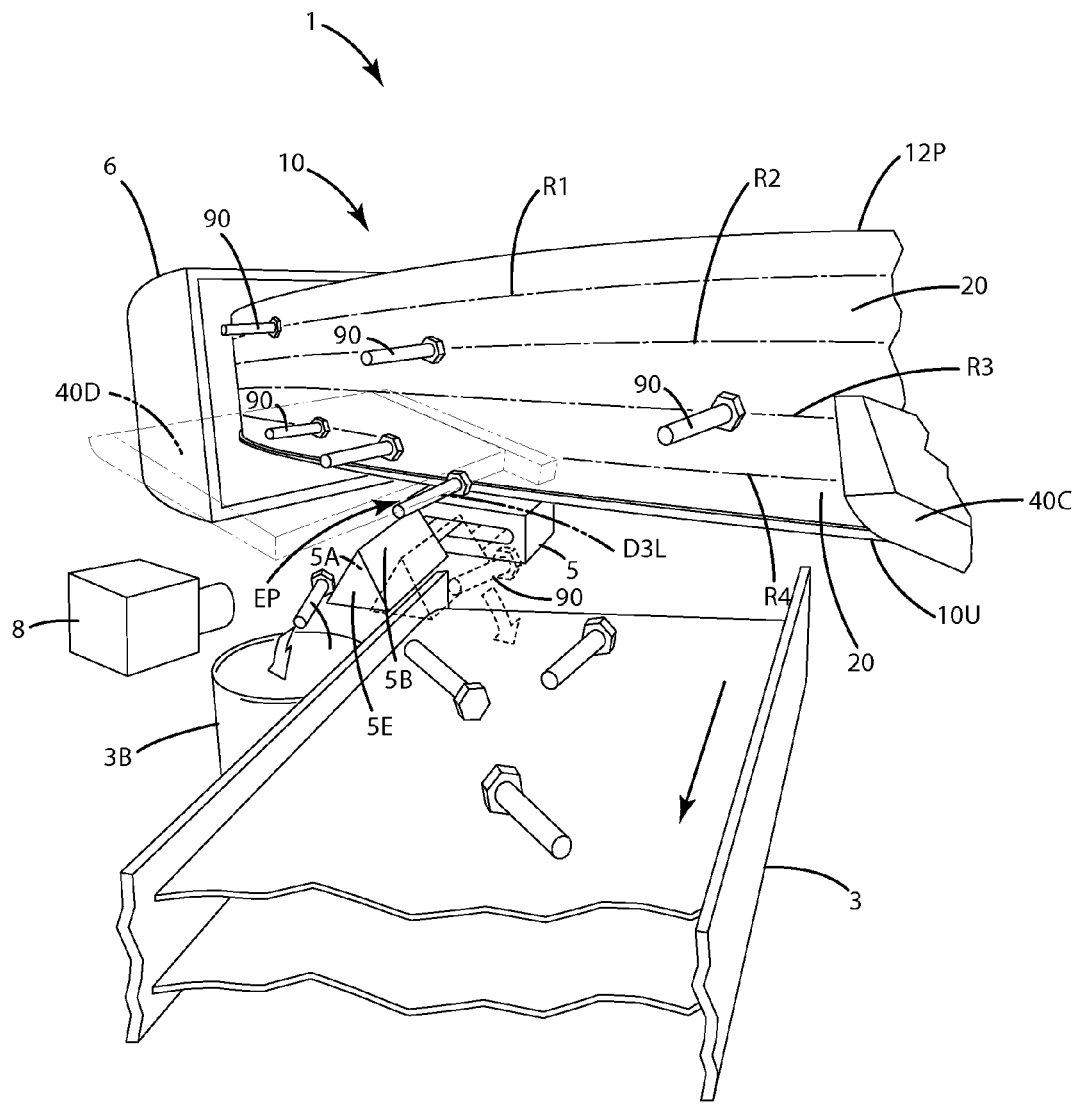
FIG. 10 is a perspective view of a sorter adjacent the dial assembly.

As illustrated in FIGS. 4, 9 and 10, the machine 1 can include an inspection station 8 that is placed adjacent the dial assembly, and in particular in a position that can collect images for analysis of fasteners before they are taken off the dial. The inspection section 8 can include a camera or other sensor capable of collecting images, or otherwise collecting data or information concerning the fasteners 90. This data can be processed by the controller 9 which is in communication with the inspection station 8. From there, certain fasteners 90 can be determined to be conforming or nonconforming.

Based on the inspection, and the determination of whether a particular fastener is conforming or nonconforming, as they are diverted by the last diverter D3 off the lowermost portion of the dial assembly 10, the fasteners can either be deposited on a conveyer 3 or ejected to a collection bin 3B. Typically nonconforming parts are disposed in a collection bin 3B. Conforming parts are ejected from the dial 10 onto the conveyer 3, and transported to another processing, packaging and/or distribution station.

Optionally, the inspection station 8 can work in conjunction with the controller 9 and a sorter 5 which is controlled by the controller 9 as well. The sorter 5 can be configured so that it includes opposing ramps 5A and 5B, which are selectively generally disposed under the ejection point EP of the last diverter D3. A falling fastener can engage the ramp 5A or the ramp 5B depending on the location of the sorter element 5E. For example, as shown in solid lines on FIG. 10, when the sorter element 5E is oriented with the surface 5B under the exit point EP, fasteners 90 are dropped and directed toward the conveyer 3. Generally, these fasteners can be conforming fasteners. The sorter 5 can hold the sorter element 5E in this location under pneumatic, hydraulic or other forces. When, however, a nonconforming part is detected, the air or liquid holding the element 5E in place is discontinued and/or interrupted. In this case, the sorter element 5E moves to the location shown in broken lines, in which case the second ramp 5A is placed under the exit point EP. In this case, any fasteners that exit from the exit point EP and drop on to that surface 5A are ultimately deposited in the bin 3B. The movement of the sorter element 5E to change from one ramp to the other can be triggered by the inspection station 8 detecting a nonconforming or conforming part or some other parameter, which is relayed to the controller, which then controls the sorter to sort the parts either onto the conveyor 3 or to the waste bin 3B.

Optionally, as illustrated in FIG. 10, the dial assembly 10 can be constructed to include a lower plate 10U. This lower plate 10U can be located along the lowermost portion of the outer dial perimeter 12P. This lower plate 10U can be constructed from a non-magnetic material, such as stainless steel, magnesium, or aluminum and the like. With this construction, fasteners 90 exiting at the exit point EP, which still may be partially magnetized due to engagement with the work piece engaging surface, typically do not reattach to the underside of the dial assembly 10. Again this is because even though they are magnetized, the lower plate 10U is non-magnetic, so there is no attraction between the fastener and that element. The lower most portion 40DL of the diverter plate 40D can be positioned at or below the lower plate 10U to assist in transitioning the fasteners off the dial assembly 10 and to the conveyor 3. Optionally, with the lower plate 10U being non-magnetic, the fasteners are less likely to be daisy chained to one another due to the magnetic forces being transferred from one fastener to the next fastener. Again, this can prevent fasteners from piling up under the diverter plate or otherwise becoming magnetically attracted to the underside of the dial assembly 10.

Figure 3:
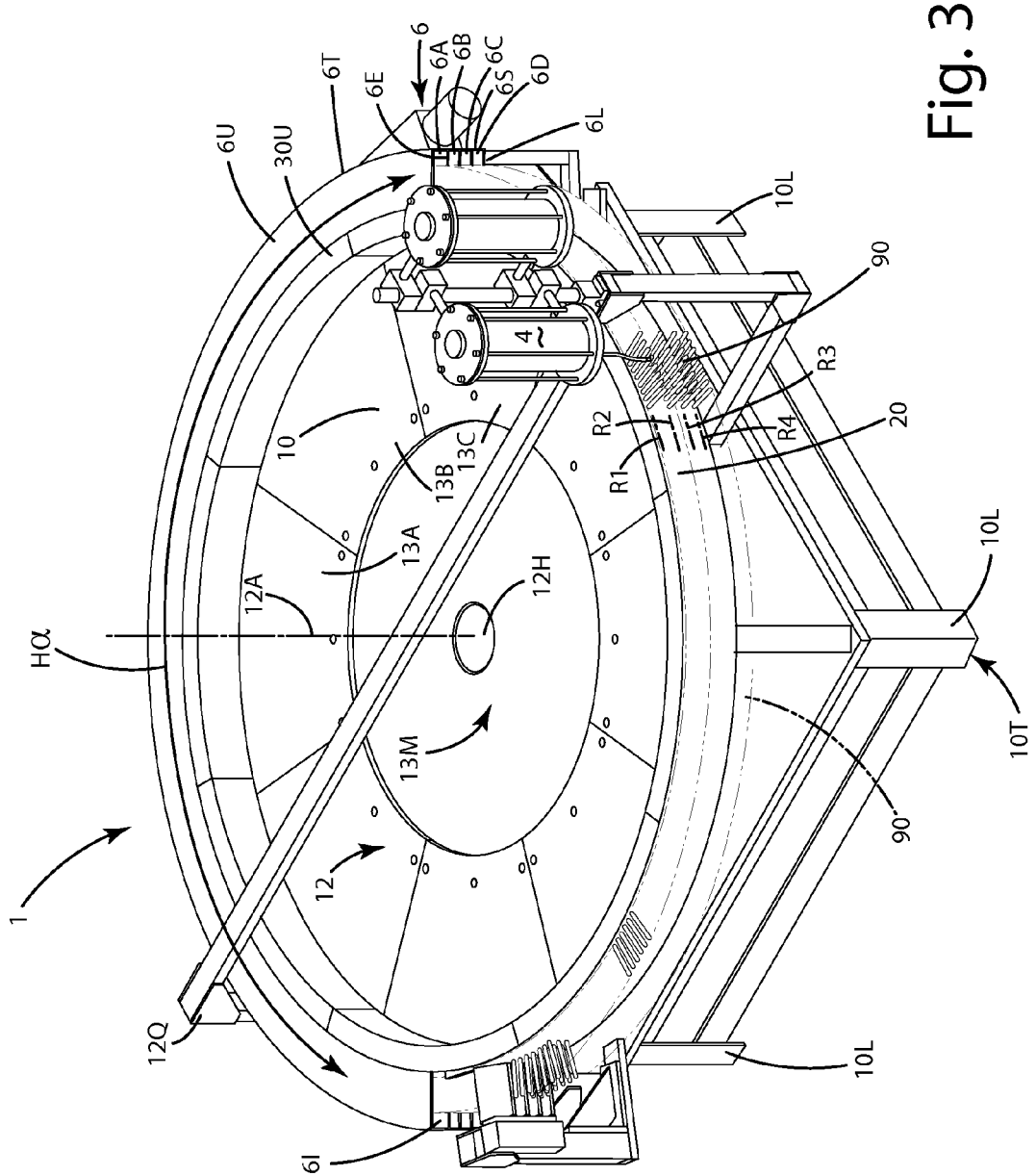
FIG. 3 is a perspective view of the dial assembly of the current embodiment included in a machine.
Figure 5:
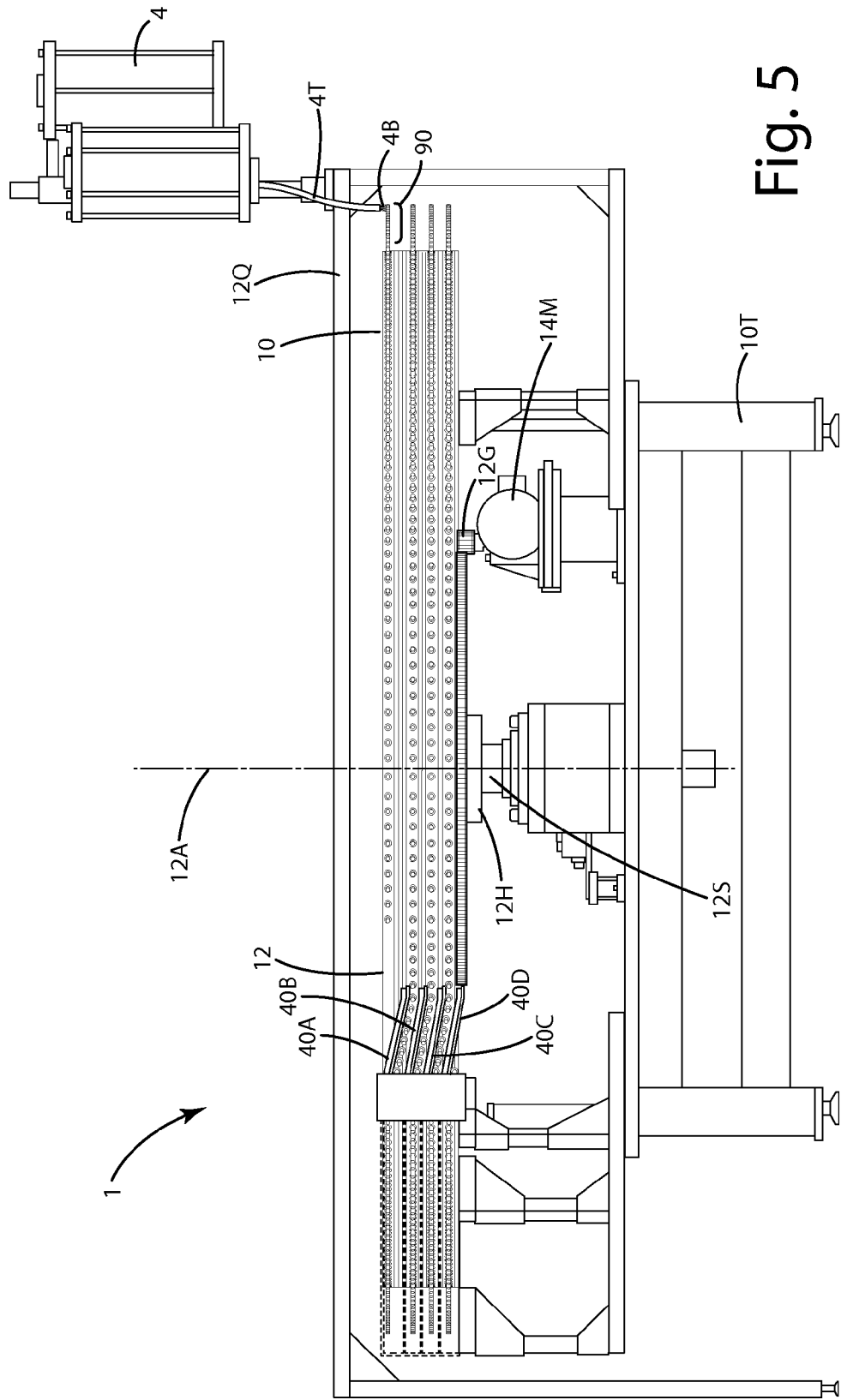
FIG. 5 is a side view of the dial assembly included in the machine.

As previously mentioned, the machine 1 can include a dial assembly 10. That dial assembly will now be described in more detail. As shown in FIG. 3, the dial assembly 10 can be mounted to a support table 10T. The support table 10T can include multiple legs 10L extending downwardly from below the dial assembly 10 and in particular the primary dial member 12. The dial assembly also can include a motor 14M, as shown in FIG. 5. The motor can be any type of electric, pneumatic, hydraulic or other suitable motor. The motor can be coupled to a gear reducer 12G. Both can be secured to the table 10T generally located under the dial assembly 10. The motor 14M can be in communication with the controller 9 which can control the operation thereof, including the speed of rotation, any stopping or starting of rotation or other aspects of movement of the dial assembly. Optionally, the table 10T can include a leveling device and/or sensor to ensure that the dial assembly is generally substantially horizontal when in operation.

The primary dial number 10 can be mounted on the table and can rotate within a generally horizontal plane or some other plane that is generally parallel in relationship to the floor or ground of the facility within which the machine 1 is implemented. The primary dial member 12 can be mounted to the table at and can rotate about the dial axis 12A. The dial assembly, and in particular, the primary dial member 12 can be mounted to a spindle or hub 12H, and an associated shaft 12S. The hub 12H can allow free rotation of the dial 12 and specifically the primary dial member 10 about the dial axis 12A. With the motor 14M and gear reducer 12G, the primary dial member 12 can be rotated on the hub 12 and shaft 12S so that the work piece engaging surface 20 generally follows a circular path disposed radially outward from the axis 12A.

The dial assembly 10 can also include other support structures 12Q, such as a support bar extending across the dial assembly. Other components of the machine 1, such as the processing station 4 can be mounted to this support structure 12Q. Other support structures can be located in other regions, depending on the particular processing stations, feed stations or other stations desired to be disposed about the outer dial perimeter 12P.

The dial assembly 10 includes a primary dial member 12. This primary dial member 12 can be of a modular form. For example, as shown in FIGS. 3 and 12, the primary dial member 12 can include multiple segments 13A, 13B, 13C and so on. These segments can be of generally arcuate configuration. The inside portions of the segments can be joined with a main body 13M of the primary dial number 12. This main body 13M can be attached directly to the hub 12H and generally centered on the dial axis 12A. The main body 13M can be joined with the segments 13A-13C, for example, using fasteners such as screws, bolts, rivets or other removable-type fasteners or connection elements. This construction can be suitable for instances where the machine 1, and in particular, the primary dial member 12 will be shipped considerable distances. It can be helpful in such cases to ship the primary dial member in parts rather than as a large, fully assembled construction. This can make the collection of components of the dial member less bulky. Of course, if desired, the primary dial member 12 can be constructed as a single unitary piece where appropriate.

Optionally, the dial assembly, and in particular, the primary dial member 12 can include a diameter of optionally at least about 2 feet, further optionally about 4 feet, even further optionally at least about 6 feet, and even further optionally about 8 feet, 10 feet, 12 feet or other dimensions depending upon the particular application of the number of linear feet desired to transport the fasteners and/or floor space available where the machine 1 is located.

As shown in FIG. 12, the arcuate segments 13A and 13B can be constructed so that they can be easily joined with the main body 13 as shown in FIG. 3. For this purpose, the lower surface 13L of the segments can include a recess 13R. When assembled on the main body 13M, a portion of the main body can extend within this recess and can assist in consistent radial and longitudinal and other alignment of the arcuate segments with the main body. Each arcuate segment can consume a particular angle about the dial axis 12A. As illustrated, each segment traverses about 45° around the axis 12A. Of course, these segments can be divided and subdivided into smaller components which can traverse optionally about 22.5°, 12.25°, 90°, 180° or other angles about the dial axis 12A, again depending on the application and any shipping and handling parameters.

Each arcuate segment 13A and 13B can include an upper surface 13U which is opposite the lower surface 13L. Generally, the upper surface 13U and the lower surface 13L are substantially parallel to one another. Where the dial assembly is utilized in a generally horizontal orientation, the upper surface and lower surface can be generally or substantially horizontal and/or parallel with the ground or floor of the facility in which the machine 1 is located. The respective segments also can include one or more tongue connectors 13T. As shown, a tongue connector 13T of arcuate segment 13B is generally continuous from a first end 13E1 to a second end 13E2. Of course, that tongue 13T can be interrupted and can be comprised of multiple individual tongues spaced from one another from the first end 13E1 to the second end 13E2, depending on the particular application. As illustrated, the tongue 13T can extend outward from the outermost edge 13O of the arcuate segment a preselected distance T1. This distance can be selected so that it cleanly fits within the recess 30R of exemplary magnetic module 30A. As an example, the thickness T1 can be selected so that the tongue fits directly adjacent and perhaps abuts the magnet 34 disposed within the recess 30R of the magnetic module 30A. The thickness T1 can range from optionally about 1" to about 5", further optionally about 2" to about 3" or other thicknesses as desired. If desired, the magnet can have a height H2 that is substantially equal to the height H1 of the connector tongue 13T. The recess 30R also can have a height dimension H2 which is greater than the height dimension H1 of the connector tongue 13T so that it can cleanly fit inside the recess 30R. The heights H1, H2 can range from optionally about ¼" to about 2", further optionally about ½" to about 1½", and even further optionally about 1". The height H2 can be slightly larger than the height H1 depending on the particular application. The connector tongue 13T transitions to upper and lower walls 13W which themselves transition to the upper surface 13U and lower surface 13L of the segment 13B. The walls 13W can be generally perpendicular to the upper and lower surfaces of the tongue 13T, and can optionally be generally perpendicular to the upper 13U and lower surface 13L of the segment 13B. Again, the other segments can include identical components as those described in connection with the segment 13B in FIG. 12.

As mentioned above in connection with the arcuate segments 13A, 13B and 13C of the primary dial member 12, those segments can be joined at one or more seams 13S. To enhance the structural rigidity of the overall dial primary number 12, the magnetic modules 30, and for example, magnetic module 30A can be disposed on the arcuate segments, generally overlapping both segments on opposing sides of the seam. This is illustrated again in FIG. 12. There, the magnetic module 30A is shown in broken lines, joined with both of the arcuate segments 13A and 13B, overlapping about half of each. Of course, the overlap by the magnetic module 30A can be ¼ to ¾, ¼ to ½ and/or ½ to ¾ or other amounts of the respective segments 13A and 13B. When the magnetic module 30A is so mounted, the recess 30R is generally filled with the tongue 13T of both segments 13A and 13B, that is, a portion of the tongue 13T of segment 13B is located within the recess, and a portion of the tongue 13T of the segment 13A is also located within the recess.

Figure 14:
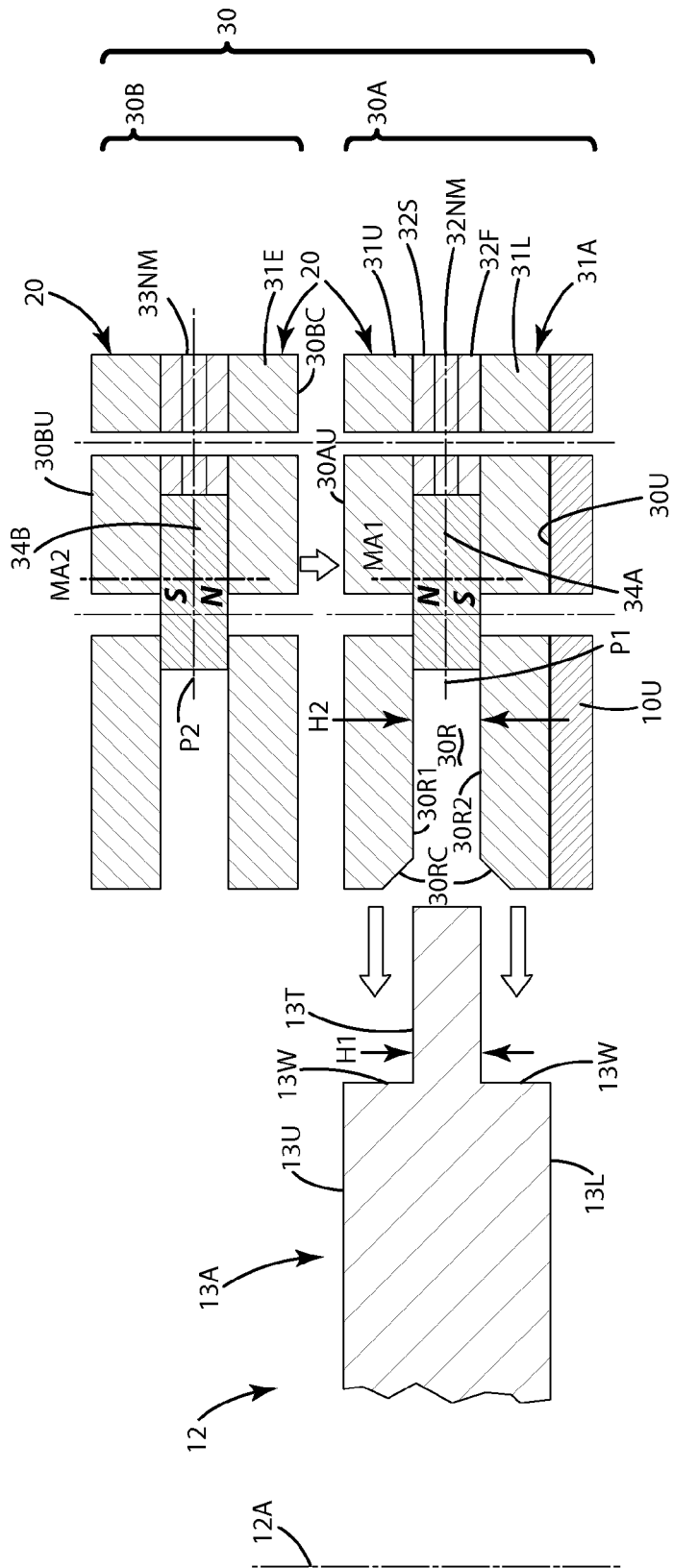
FIG. 14 is a partial section view of a first magnetic module being joined with a primary dial member and a second magnetic module being joined with the first magnetic module.

The interfitment of this tongue 13T is shown further in FIG. 14. There, the recess 30R aligns with the tongue 13T. The tongue 13T is then slid into the recess 30R, or the module 30A is slid on to the primary dial number 12, and in particular, the tongue 13T. Optionally, the inner walls or portions 30R1 and 30R2 of the recess 30R can include a chamfer 30RC which can be a rounded and/or angled surface relative to the inner walls 30R1 and 30R2 of the recess 30R. This can facilitate guiding of the tongue 13T into the recess 13. This can be helpful were the height H1 is very close to the height H2 of the respective tongue and recess.

As mentioned above, the dial assembly 10 can include a work piece engaging surface 20. As shown in FIGS. 1-4, this work piece engaging surface 20 can extend around the circumference of the dial assembly 10, generally around the outer dial perimeter 12P. The work piece engaging surface 20 can include an optional cover element 20C. This cover element can be any type of magnetic element, such as a thin sheet or layer. Optionally, this cover element 20C is constructed from thin sheet of magnetic metal so that any magnetic forces transmitted by the magnetic modules 30 are conveyed through the cover element 20C and generally the work piece engaging surface 20. Again, as used herein, work piece engaging surface can include any type of surface that engages the fasteners 90 during operation of the dial assembly, and can include a cover element 20C disposed on or adjacent the work piece engaging surface 20. When so included, the outer surface of the cover element also can be considered a work piece engaging surface.

Optionally, the cover element 20C can be removable from the dial assembly. Accordingly, if the work piece engaging surface, when including the cover element 20C, becomes worn or damaged, it can easily be removed and replaced to provide a new work piece engaging surface 20. This can reduce the overall wear on the magnetic modules, and in particular, the outermost facing surfaces which are adjacent and/or which form the work piece engaging surface 20.

As mentioned above, the work piece engaging surface 12 extends around the outer dial perimeter 12P as in the embodiment illustrated in FIGS. 1-4. However, the work piece engaging surface 20 can be oriented differently. It can be disposed generally adjacent the upper surface 12U or adjacent lower surface 12L of the dial 12 as described in the alternative embodiment below.

Further, although the outer dial perimeter 12P is illustrated as being generally circular, it can be polygonal or slightly eccentric or elliptical, depending on the particular application, desired rotation, and processing of work pieces thereon. Generally, the work piece engaging surface 20 can extend substantially or 100% around the outer dial perimeter 12P. If desired, the work piece engaging surface might be interrupted and can extend lesser amounts around the outer dial perimeter. Generally, when fasteners 90 engage the work piece engaging surface 20 and are magnetically attracted to the same, the longitudinal axes FLA of the fasteners 90 can extend generally perpendicular to the work piece engaging surface 20, and the longitudinal axes FLA of the fasteners 90 can extend radially outward from the dial axis 12A as illustrated in FIGS. 1 and 2A.

As shown in FIGS. 1, 13 and 14, the magnetic will now be described in more detail. In particular, the magnetic modules 30 can include multiple individual magnetic modules 30A, 30B, 30C and 30D. For purposes of description, the features of magnetic module 30A will be described. These features can be included in the other modules as desired. The magnetic module 30A can include a housing including a lower magnetic segment 31L and an upper magnetic segment 31U. The upper and lower segments 31U and 31L are separated from one another by the height H2, which generally corresponds to the height of the recess 30R.

Between the upper and lower segments, adjacent the work piece engaging surface 20, additional partial segments or layers can be disposed. Specifically, as illustrated in FIG. 14, the magnetic module 30A includes a first intermediate layer 32F and a second intermediate layer 32S. These intermediate layers or segments 32F and 32S can be constructed from a magnetic material such as those from which the upper and lower segments and layers 31L and 31U are constructed. A non-magnetic layer or element 32NM is disposed between these intermediate layers 32F and 32S. The non-magnetic element 32NM can be constructed from stainless steel, aluminum, ceramic, composite or some other insulating or other non-magnetic material. Generally, the non-magnetic element is disposed between adjacent magnetic elements and further disposed between the work piece engaging surface 20S and the magnet 34. Generally, all of these segments or layers 32S, 32F and 32NM can all be of substantially equal widths and heights. Of course, if desired, the intermediate layers 32F and 32S can be of a greater height than the non-magnetic layer 32NM, or vice versa.

The various magnetic layers, magnetic segments and magnetic members of the housing of each of the modules can be constructed from any suitable magnetizable material or any magnetically transmissive material. An example of suitable material includes steel, steel alloys such as 1018CRS, iron structures and the like.

The upper magnetic module layer 31U and lower magnetic module layer 31L or segment, can general be secured with one or more fasteners or other elements to one another and to the intermediate layers 32S, 32F as well as the non-magnetic layer 32NM. Optionally, the upper layer 31U and second intermediate layer 31S can be formed as an integral piece, while the lower or second layer or segment 31L and intermediate layer or segment 32F also can be formed as an integral piece. This, of course, can require additional milling and machining. In other constructions, the components of the housing and the different layers in particular, can be cemented, bolted, welded or otherwise fastened to one another. Where the fasteners are manually removable, the magnetic modules can be easily disassembled and reassembled with replacement or repair parts, and otherwise can be easily serviced. The construction of the individual components of the magnetic module housing also can be made easier because each of the layers can be generally flat, plate-like structures formed in an arcuate shape.

As mentioned above, the first magnetic module 30A optionally can include a lower plate 10U. This plate also can be constructed from a non-magnetic material and can facilitate take-off or removal of fasteners from the work piece engaging surface 20 as the dial assembly is utilized. This lower plate 10U can be joined generally with the lower surface 30AL of the magnetic module 30A. Generally, the lower plate can extend inwardly from the work piece engaging surface 20 toward the dial axis 12A. Optionally, the non-magnetic plate 10U can be same width as the lower magnetic layer or segment 31L, or other lengths as desired.

As shown in FIG. 14, the second magnetic module 30B can be constructed similar to the first magnetic module 30A, but simply located in a different level or layer. Optionally, the plate 10U can be absent from the lower surface 30BL of the second magnetic module 30B. As illustrated, the module 30B is considered to be stacked atop the first module 30A. This can result in a layered or stacked configuration of the magnets 34A and 34B, generally, one over the other. The magnets in this configuration are also located in different levels. It is noted that depending on the desired number of rows of fasteners processed by the dial assembly, any number of magnetic modules can be stacked one atop the other, located in different levels of magnetic modules.

Generally, the lower surface 30BL of the second segment 30B is placed adjacent and contacting or engaging the upper surface 30AU of the first magnetic module 30A. When these are satisfactorily placed, and the work piece engaging surface 20 of each of the modules are aligned, fasteners can be positioned to join the second magnetic module 30B to the first magnetic module 30A. Alternatively, the magnetic modules 30A and 30B can be of a uniform construction, generally with the upper plate 31U of the first module 30A and the lower plate 31E of the second module 30B being an integral single piece layer or segment. While this can provide additional rows of fasteners conveyed by the dial assembly, it can make replacement of the components of the respective modules somewhat cumbersome. Nonetheless, it can still be a suitable alternative embodiment, depending on the application.

Each magnetic module can include multiple magnets. For example, as shown in FIGS. 1, 13 and 14, the magnet modules include magnets 34A, 34B, 34C and 34D associated with each of the respective modules 30A, 30B, 30C and 30D.

The magnets 34A, 34B, 34C and 34D can be comprised of multiple individual magnets placed end for end adjacent one another within a respective housing. For example, with reference to FIGS. 13 and 14, in the housing of module 30A, and in particular, the recess 30R, the first magnet 34A can be disposed between the upper surface 30R1 and lower surface 30R2 of the recess 30R. The magnet 34A can be disposed immediately adjacent the segments or layers 32S, 32F, as well as the non-magnetic layer 32NM. Magnetic forces generated by the magnet 34A thus can be transferred through the various layers, for example, through the lower layer 31L, the first intermediate layer 32F, the second intermediate layer 32S and the upper layer 31U. The magnetic force can be concentrated along the outer work piece engaging surface 20, optionally at, adjacent and/or centered at or near the non-magnetic element 32NM facing the work piece engaging surface 20.

As further shown in FIG. 13, each magnetic module, for example, the first magnetic module 30A, can include multiple magnets 34A1, 34A2, 34A3, etc. that traverse from a first end 30E1 to a second 30E2 of the magnetic module 30A. These magnets are considered to be disposed in a single layer or level and can be positioned end-to-end. Within this level or layer, all of the magnets 34A1, 34A2, 34A3 can lay in a common plane. Optionally the magnets of other magnetic modules in other levels or layers can be disposed generally in another, separate but parallel common plane. Within this level or layer of magnets, each of the magnets are identically oriented, with each of their north magnetic poles facing in a first common direction, e.g., all up, and each of their south magnetic poles facing in a second common direction, for example, all down. For example, as shown in FIG. 14, all the magnets in the level or layer associated with the magnet 34A can be oriented with the north pole of the magnets facing up and the south pole of the magnets facing down. Generally, each of the magnets can include a north/south magnetic axis, for example, magnetic axis MA1 of magnet 34A. The magnetic axis MA1 as shown in FIG. 14 can be generally parallel to the work piece engaging surface 20. The magnetic axis MA2 of the other respective magnets 34B in other layers or levels also can be generally parallel to the dial axis 12A and/or perpendicular to the upper 13U and lower 13L surfaces of the primary dial number 12. These magnetic axes also can be generally perpendicular to the longitudinal axes FLA of the respective fasteners 90 when properly joined with the work piece engaging surface 20.

Each magnet can be constructed from a material that can generate a suitable magnetic field. The material can be present as a single magnet or multiple magnets adjacent the work piece engaging surface 20. Suitable types of magnets can include ceramic magnets such as C8 magnets, neodymium magnets and other types of magnets. The magnets can be dimensioned as a three-dimensional rectangular shape, but of course, they can be shaped instead as cylindrical elements, box-shaped elements, triangular elements, or the like depending on the particular application. As illustrated, the magnets in their rectangular box configuration can be about 0.375"×1"×2", but of course, any other dimensions may be selected depending on the particular application.

Optionally, the material from which the magnets are constructed is sufficient to generate an attractive force and maintain the work pieces, for example, the fasteners 90 in a releasable yet fixed orientation relative to the work piece engaging surface. As mentioned above, the magnets can hold a fastener 90 head first against the work piece engaging surface 20 with the fastener longitudinal axis FLA projecting perpendicular to that surface and radially outward from the dial axis 12A. The magnetic strength of the magnets to achieve this can be preselected. As an example, the magnetic strength of the dial assembly and its magnets can be measured by a standard force gauge, outfitted with a 1" diameter sphere at the end of the force gauge. This sphere can be 1" in diameter and comprised of a ferrous material. It can be placed on the magnetic surface, and in particular, the work piece engaging surface 20 of the dial, optionally adjacent the non-magnetic elements. It is pulled outwardly and the pull force or strength of a horizontal pulling motion is recorded. Optionally, for specific embodiments, the magnets can be constructed to have a pull force at the work piece engaging surface of optionally between about 0.1 pounds and about 40 pounds, further optionally about 0.25 pounds and about 20 pounds, and even further optionally about 5 pounds to about 10 pounds. This pull force can accommodate a wide variety of work pieces such as fasteners that are processed with the dial assembly.

Optionally, the magnets of each of the magnetic modules are placed radially inward from the work piece engaging surface a preselected distance so that the magnet exerts a desired magnetic force at the work piece engaging surface 20 to sufficiently engage and hold and attract work pieces such as fasteners thereto.

Without being bound in a particular theory, it is believed that the configuration of each magnetic module 30A, 30B, 30C and 30D generates via the magnet a magnetic field that centers each fastener at a location approximate to the non-magnetic element, for example, 32NM of module 30A and non-magnetic element 33NM of the next module 30B. In turn, this attracts and holds the fasteners at these locations in predefined rows, separated from one another by a row separation distance, for example, row separation distance RS1, RS2 and/or RS3 between the respective rows R1, R2, R3 and R4 as illustrated in FIG. 1. These row separation distances can be optionally about 1" to about 6", further optionally about 1" to about 3" or other distances depending on the particular application and the distance desired between the rows for processing of the fasteners within each row.

As mentioned above, the dial assembly 10 includes multiple layers of magnetic modules 30A, 30B, 30C and 30D stacked one upon the other in different levels. Multiples of these modules also are oriented around the dial axis 12A and generally circumferentiate the dial axis adjacent the work piece engaging surface 20. Each magnetic module in each respective level or layer can be oriented similarly, with the north/south magnetic axes MA of each magnet in the particular layer oriented identically, for example with all north poles facing up and all the south poles facing down or vice versa.

The magnetic modules of adjacent layers, however, can be specifically oriented to take advantage of the magnetic attractive and/or repulsive forces of magnets. Specifically, with reference to FIGS. 1 and 14, magnet 34A (or generally all of the magnets 34A in a particular module 30A) can be oriented with all north poles facing up and all south poles facing down. The next module 30B can be joined with the first module 30A in another level. The magnets in the module 30B can be in a common plane P2, which plane is separate and distal from the common plane P1 in which all the magnets in the first module 30A are disposed. The magnets in the second module 30B also are reversed. Specifically, the magnet 34B of this module is positioned so that the north pole faces down and the south pole faces up. Thus, the north pole of the first magnet 34A is facing toward and close to the north pole of the second magnet 34B. The north poles of each of the first and second magnets 34A and 34B also are both located between the first south pole of the first magnet 34A and the second south pole of the second magnet 34B.

It is believed that with the north poles of modules of one level and the second magnets of modules in another level facing toward one another, a repulsive force is generated between the first magnets. Of course, because the magnets are held in the housings and respective magnetic modules, they do not actually move and repulse one another. However, it is believed that their magnetic fluxes can be warped or otherwise modified so that the greatest attractive magnetic forces exerted through the work piece engaging surface 20 are concentrated adjacent the non-magnetic elements adjacent the work piece engaging surface. With the magnetic forces concentrated near the non-magnetic elements, it is believed that a self-alignment mechanism is created along the work piece engaging surface 20 to generally center the strongest magnetic attractive force along the rows R1, R2, R3, R4, etc. and so that the fasteners are inclined to center and be attracted directly along those rows R1, R2, R3, R4, etc. Alternatively, and again not being bound by any particular theory, it is possible that by virtue of the same poles facing one another creates a magnetic force that assists in holding the fasteners so that their fastener longitudinal axes FLA point radially outward from the axis 12A of the dial, and so that those fasteners stay separated from one another and do not attract to one another while being conveyed on the work piece engaging surface 20. This can prevent the outermost ends of the fasteners from being pulled toward one another via a magnetic force such that the rows become combined with multiple fasteners in effect sticking to one another unintentionally.

Where additional magnetic modules are stacked upon the other layers or levels of modules, for example, 30C is stacked upon 30B to form another level or layer of modules, the magnets 34C of that next layer or level are oriented so that the south pole is facing down and generally toward the upward facing south pole of the magnet 34B. The north pole of the magnet 34C faces upward or away from the magnetic module 30B. The next magnetic module 30D of the next layer or level includes a magnet 34D having a north pole facing toward the north pole of the magnet 34C and a south pole facing the opposite direction.

The dial assembly 10 can include multiple magnetic elements that are disposed along a common axis CA as shown in FIG. 1. That common axis CA is generally parallel to the dial axis 12A and/or the work piece engaging surface 20. The magnets along that axis in the different levels or layers can be disposed with an alternating polar relationship, which means that where two adjacent magnets are disposed along the common axis, both of those magnets have either their north poles facing one another or south poles facing one another, with the other opposing south or north poles respectively facing away from one another. As another example, the north poles of magnets along the common axis CA face generally toward one another, and the south poles of those magnets are separated from one another by the north poles of both first and second magnets being located between their south poles. As yet another example, along the common axis CA, the magnets can be disposed in different levels or layers having an alternating south, north, north, south, south, north, etc. configuration. Optionally, two magnets, for example, magnets 34A and 34C can be oriented with their north poles pointed upward along the common axis CA and at least one intermediate magnet, for example, 34B, is oriented between those magnets 34A and 34C with the south pole pointing upward along the common axis CA. It should be noted that the common axis need not mean that the geometric center of each of the magnets be aligned perfectly along that common axis—rather the magnets can simply be oriented so that the magnetic forces of the respective north and south poles generally center on and/or are disposed along the common axes. Also contemplated is a generally reversed configuration in which the magnets north and south orientations are reversed for each individual magnet 34A, 34B, 34C and 34D.

As illustrated in FIGS. 1-3, the dial assembly 12 conveys work pieces such as fasteners in multiple rows R1, R2, R3, etc. The dial assembly can be constructed so that it conveys the fasteners 90 in two or more rows about a circumference around the dial assembly. As the dial assembly 10 and specifically the work piece engaging surface 20 rotates around the dial axis, each of the fasteners, after being magnetically attracted and held adjacent the work piece engaging surface 20 follows one or more circular paths around the dial axis 12A. These multiple circular paths can be separated by the row separation distance RS1, RS2, RS3, etc. Again, these row separation distances can correspond to the spacing generated by the magnetic forces of the magnetic modules and respective magnets. The various rows R1, R2, R3, etc., can also be continuous with one another. For example, row R1 can be joined with row R2 at some location. Thus, after being attracted to the dial, fasteners traveling about the dial can travel in the first row R1, in the second row R2, the third row R3 and so on until the fasteners are taken off the dial.

Figure 7:
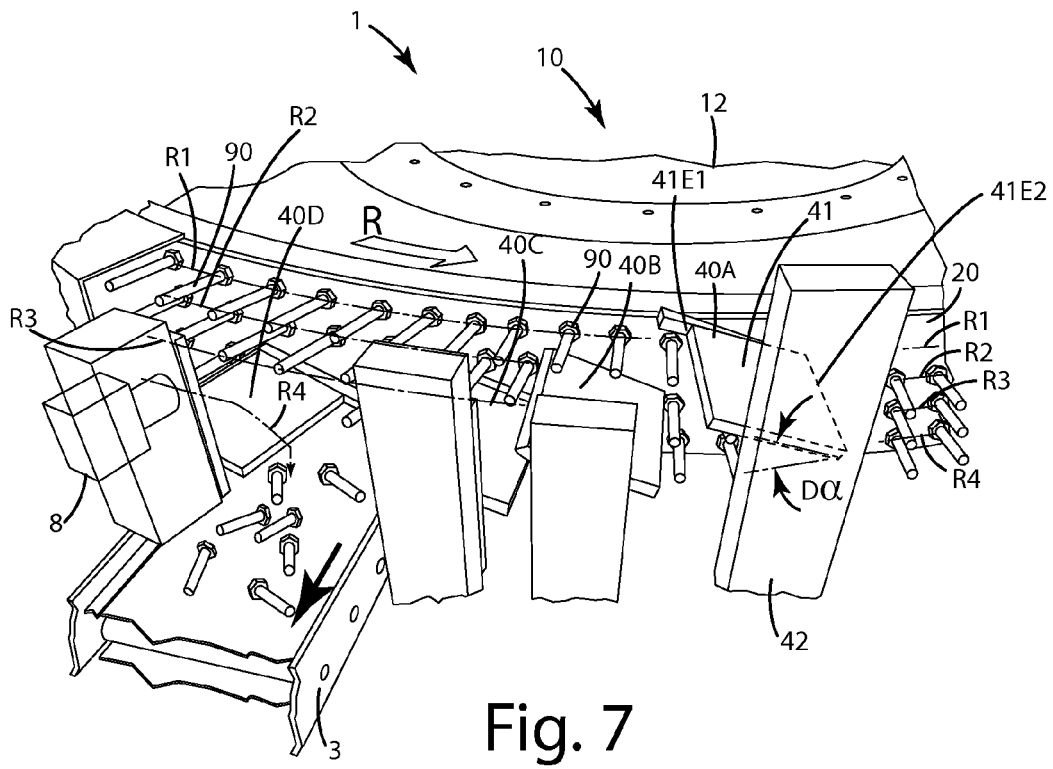
FIG. 7 is a perspective view of multiple rows of work pieces on the dial assembly being diverted by multiple diverters.

As shown in FIGS. 7-8, the dial assembly 10 can include multiple diverters 40A, 40B, 40C and 40D, depending on the particular number of rows desired to transport fasteners around the dial axis 12A along the work piece engaging surface 20. Each diverter can include a plate 41. This plate can be attached to a support 42 as shown in FIG. 7 which generally supports the diverter in a fixed orientation relative to the work piece engaging surface 20. The support can include slots or other mechanism to enable a user to adjust the orientation of the plate 41 relative to the work piece engaging surface 20. For example, the plate can be adjusted to various diverter angles Dα depending on the desired row separation distance desired between rows.

In operation, as the dial assembly rotates, the first row R1 traverses from the feed station 2 around the dial axis 12A. Eventually, that first row R1 encounters the first diverter 40A. Upon encountering the first diverter 40, and in particular the plate 41, the fasteners in row R1 are moved downward so that by the time the dial rotates sufficiently for particular fastener to fully engage the plate 41, that fastener is pulled out of alignment with row R1 and placed into alignment with row R2, thus beginning the second row R2.

Optionally, the fasteners 90 engage the first end 41E1 of the first diverter 40A. The diverter plate 41 is angled or curved downwardly. As the dial rotates, the fasteners are held via a magnetic force adjacent the work piece engaging surface 20. The fasteners also move relative to the diverter plate 41 and due to the curved and/or angled surface, the diverter plate guides the fasteners, while still magnetically attached to the work piece engaging surface 20, downwardly until the fasteners exit the second end 41E2 of the diverter 40A. When the fasteners exit the second end, they are placed in the second row R2, below the first row R1.

Further optionally, as the fasteners in the first row initially are engaged by the first diverter 40A, they are held by the first magnet 34D in the first row R1 adjacent the nonmagnetic element 34NM of the magnetic module 30D. The physical engagement of a fastener with the diverter plate 41, however, effectively pushes or moves that fastener 90 downward. During this downward movement, the fastener longitudinal axis FLA remains perpendicular to the work piece engaging surface, with the head still engaged with that surface. As the fastener in the first row R1 moves away from the magnetic force generated by the magnet 34D it moves closer to the magnetic forces generated by the next magnet 34C until those forces of the other magnet 34C take over and generally center the fastener 90 in the row R2. In this manner, the fasteners within the first row R1 can be conveyed or moved into a second row R2. This process and the use of the diverters can continue, diverting fasteners from second row R2 to third row R3, and third row R3 to fourth row R4, respectively, using the respective diverters 40B, 40C and 40D. Where additional rows are desired to be conveyed around the dial assembly, additional diverters can be added.

Further, it is contemplated that the diverters can be specifically spaced to establish preselected row separation distances, for example RS1, RS2, RS3 between the rows. Where perhaps an additional processing station is desired to process the last row or any intermediate row, the row spacing between that row and an immediately adjacent row, can be increased by increasing the diverter angle Dα or otherwise altering the configuration of the plate relative to the rows.

As mentioned above, each of the diverters can be disposed at a preselected diverter angle Dα. This diverter angle Dα can be relative to a curved circular path corresponding, for example to the first row R1 of a plurality of fasteners. The diverter diverts each of the fasteners from the first row R1 to the second row R2 so that the fasteners are transferred from a first circular path corresponding to a first row R1 to a second, different circular path, for example, second row R2. Each of the first and second circular paths can be generally concentric with one another, and optionally aligned with one another in parallel, one above the other around the outer dial perimeter 12P.

III. Method of Operation

A method of operating the dial assembly, and the machine in general, will now be described. To begin, the hopper 2H of the feed station is filled with a supply of randomly oriented fasteners 90 as shown in FIGS. 4 and 6. The hopper 2H can be a vibratory hopper which vibrates under the control of the controller 9. The fasteners are oriented in the orientor 2O and travel along the track 2T toward the work piece engaging surface. As shown in FIG. 8, the track 2T is placed adjacent the work piece engaging surface 20 near an uppermost portion of the plurality of magnetic modules. The track 2T generally aligns the fasteners and feeds them sequentially into alignment with the first row R1 so that the fasteners are aligned along the row R1 and begin to follow a corresponding circular path about the dial axis. In this process, the magnet 34D (FIG. 1) of the magnetic module 30D attracts the fasteners 90 to the work piece engaging surface 20 and optionally to a cover element 20C thereof. The fastener again generally centers its head along the nonmagnetic member 34NM of that module 30D.

As further shown in FIG. 2A, the fastener 90 attaches so that the head 91 engages the work piece engaging surface 20 and the fastener longitudinal axis FLA is generally oriented at an angle B that can be substantially perpendicular to that work piece engaging surface 20 at the particular location. Each individual fastener is then conveyed as shown in FIGS. 2 and 3 along the work piece engaging surface, about the dial axis 12A.

As shown in FIG. 5, the fasteners in the row R1 pass the processing station 4. As illustrated, the processing station can be in the form of an applicator. The applicator, being controlled by the controller 9 conveys material through the tube 4T and ultimately to the brush 4B, optionally in liquid form. The material from the brush 4B is deposited on the threads 93 of the fastener in a preselected location in a preselected amount depending on the particular application.

After the individual fasteners pass the applicator in row R1, they enter the heating tunnel 6T of the heater 6. The heater tunnel 6T is heated and optionally warm air is blown therethough. The fastener, while in the first row R1 continues around the heater tunnel angle Hα, during which time heat is applied to the material to assist in curing, cooling or otherwise manipulating that material. The fastener continues in the first row R1 along the first circular path until it exits the heater 6 at the exit 6I of the heater.

The fasteners in the first row R1 engage the first diverter 40A as shown in FIGS. 7 and 8. At that point, the diverter diverts the fasteners of the first row R1 downward out of magnetic communication with the magnet 34D of the module 30D and into magnetic communication with the magnet 34C of the next lower magnetic module 30C. The fasteners remain engaged against the work piece engaging surface 30 through this transition by the diverter. By the time the dial rotates sufficiently so that the fastener transitions past the second end 41E2 of the diverter, the fasteners are moved and start to travel in to the second row R2.

The fasteners in the second row R2 pass below the track 2T of the feed station 2, optionally without additional fasteners being added to that second row R2. The fasteners then continue under the applicator 4, optionally without additional material being applied thereto. The fasteners then enter the entrance 6E of the tunnel 6T and traverse about the dial axis 12A until exiting the heater at exit 6I. As the second row of fasteners travel through the tunnel 6T, they are subjected to heat again, optionally for the same duration of time that they were subjected to the heat when the fasteners travelled in the first row R1 through the tunnel 6T. Further optionally, the first row and the second row are both subjected to the same amount of heat, for the same duration of time that they travel through the heater.

After the fasteners in the second row exit the exit 6I, they engage the next diverter 40D. This diverts fasteners from the first row R1 to the third row R3 in a similar fashion as was described in connection with the diversion from a first row R1 to the second R2. The fastener then follows a third circular pathway, in the third row R3 about the axis 12A of the dial assembly. Fasteners in this row R3 also pass the applicator, optionally without having additional material applied thereto and through the tunnel 6T. The fasteners in the third row are diverted from that third row R3 to the fourth row R4 with the diverter 40C in a similar fashion to that as the fastener is diverted from the first row R1 to the second row R2. The fasteners continue about this third circular path around the axis 12A, past the applicator 4 and the heater 6 until engaging the diverter 40C which moves the fasteners in the third row R3 to the fourth row R4 as with the other diverters above.

The fasteners in this fourth row R4 then pass a fourth time past the feed station, by the application station and the heater. After exiting the tunnel with the exit 6I, the individual fasteners are inspected at the inspection station 8. Signals are sent to the controller 9 which determines whether or not the fasteners have material sufficiently applied to them or otherwise have been processed. The last diverter 40D moves the fasteners to an exit point EP. Since no magnets are adjacent the exit point EP, and optionally the non-magnet plate 10U is located adjacent that exit point EP, the fasteners freely dropped to the sorter 5. As mentioned above, the sorter 5 is operated by the controller 9 to either deposit conforming parts on the conveyor 3 or nonconforming parts into a waste bin 3B. The conforming parts can be conveyed along the conveyor 3 for further processing, packaging, or distribution.

With the above method, fasteners can be conveyed along the dial assembly in multiple rows located in different planes, one above the other, and generally can travel a linear distance about the dial axis 12A sufficient to heat and cure the material applied to the threads thereof. With the multiple rows, a fastener can be heated multiple times by the heater 6. The same can be true for other processing applications where it is helpful for work pieces to undergo the same operation multiple times and/or for a significant amount of time.

IV. First Alternative Embodiment

Figure 15:
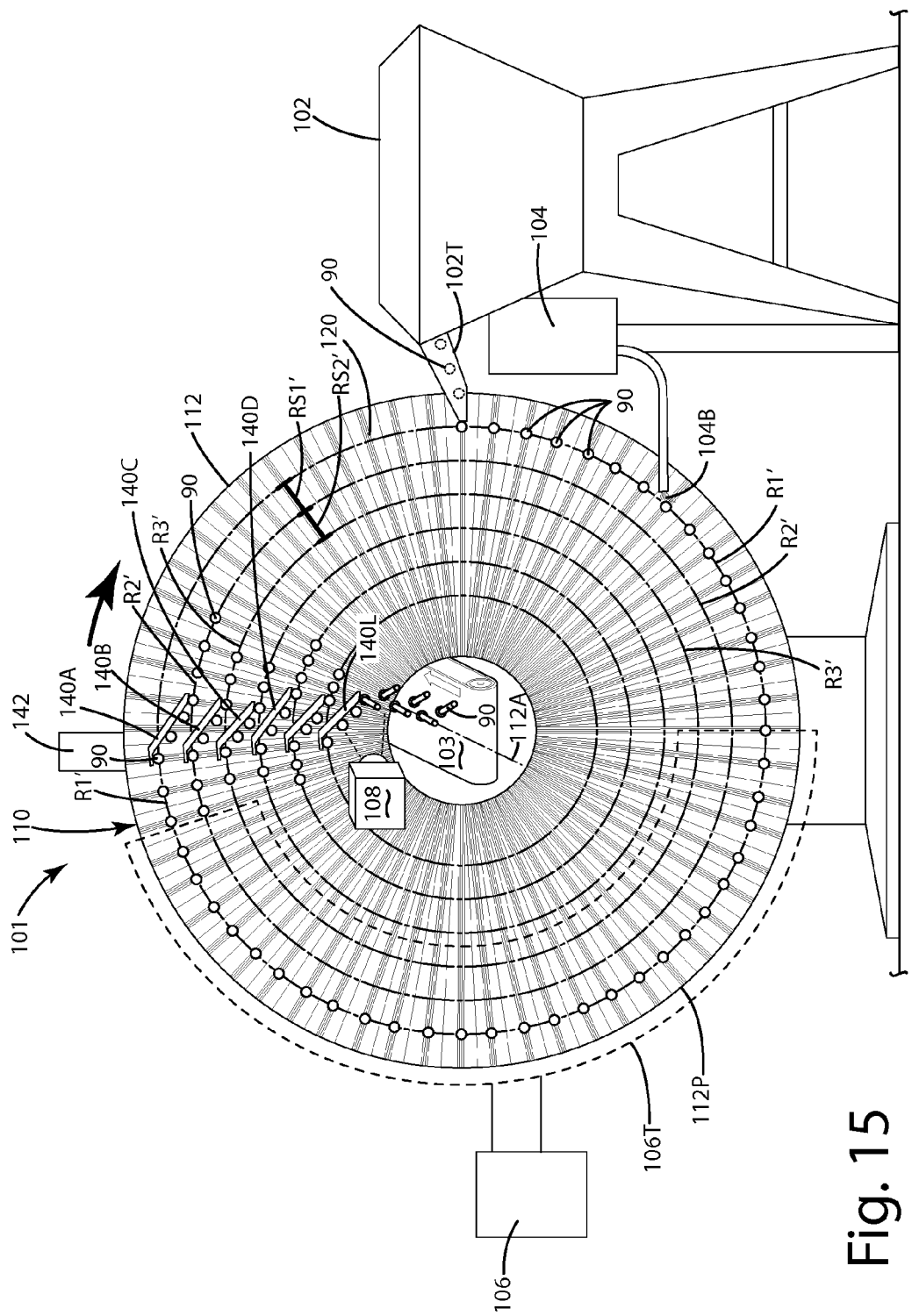
FIG. 15 is a first alternative embodiment of the conveyance device in the form of a vertically oriented dial assembly.
Figure 17:
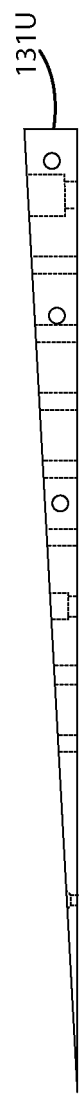
FIGS. 17-20 are top and side views of the different components of the magnetic module wedges.
Figure 18:
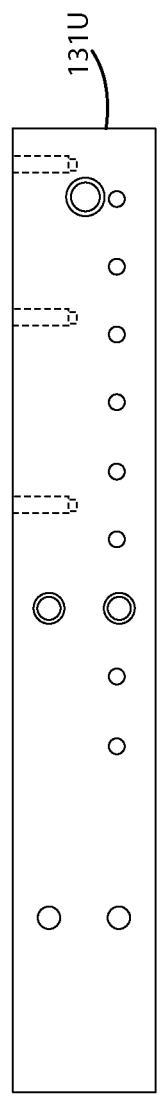
Figure 19:
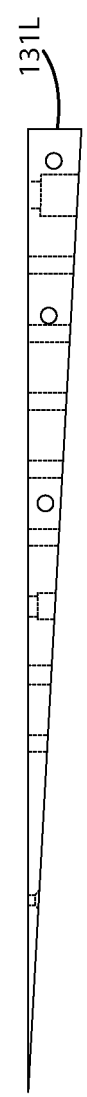
Figure 20:
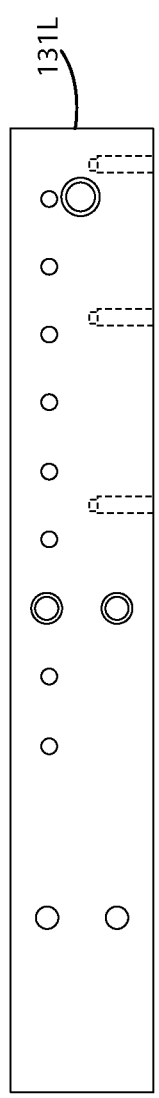

A first alternative embodiment of the machine 101 and dial assembly 110 is illustrated in FIGS. 15-16. The dial assembly 110 can be similar in structure, function, and operation to the embodiments described above with several exceptions. For example, the dial assembly 110 can be oriented in a dial plane, however, the dial plane can be non-horizontal, unlike the dial assembly 10 in the above embodiments that rotates in a generally horizontal plane. The dial assembly 110 can rotate in a substantially vertical plane which can be generally perpendicular to the support surface SS of the dial assembly 110 upon which the dial assembly is located. Of course, the dial plane within which this embodiment of the dial assembly 110 rotates can be some other angle relative to the support surface SS. For example, the dial assembly plane can be oriented optionally about 20° to 90°, further optionally about 25° to 80°, even further optionally about 35° to 60° and yet further optionally about 45° relative to the support surface SS or a horizontal plane.

The work piece engaging surface 120 of the dial assembly 110 also can be parallel to the non-horizontal dial assembly plane.

With the work piece engaging surface 120 in this configuration, the dial axis 112A can be generally orthogonal and/or perpendicular relative to the work piece engaging surface 120. Thus, when fasteners 90 are held on the work piece engaging surface 120 during rotation of the dial in direction R, the longitudinal axes FLA of those fasteners 90 are generally perpendicular or orthogonal to the work piece engaging surface 20, as further shown in FIG. 21.

The machine 101 with which the dial assembly 110 is associated can include a hopper 102 that feeds fasteners sequentially to the work piece engaging surface 120. The track 102T of the feed station places the work pieces so that the work pieces 90 engage the work piece engaging surface 120 generally facing outwardly, with longitudinal axes FLA of the work pieces generally perpendicular to and/or orthogonal to the work piece engaging surface 120. The machine 101 also can include a processing station 104, which can be similar to the processing station of the embodiments above and can apply a material to the fasteners as the fasteners pass by the processing station 104. Further, the machine 101 can include a heater 106 like that of the embodiment above, and the heater can include a heating tunnel 106T. The heating tunnel 106T can extend radially inward from an outer dial perimeter 112P of the dials generally toward the dial axis 112A. Optionally, the tunnel 106T can cover multiple ones of the circular paths which the rows R1', R2', R3', etc. follow as the rows extend and move in the circular paths around the dial axis 112A.

The dial assembly also can include multiple diverters 140A, 140B, 140C, etc. These diverters can be oriented in a fixed location adjacent the work piece engaging surface 120. The diverters 140A, 140B, 140C, etc., can be mounted to one or more supports 142 and can be disposed at diverter angles similar to those described in the embodiment above or other angles, depending on the application. The diverters 140A, 140B, 140C, etc. transfer and generally move or divert fasteners from a first row R1' to a second row R2'. In doing so, the diverters optionally move the fasteners toward or away from the dial axis 112A. As an example, the diverter 140A engages a first fastener in row R1'. As the dial rotates in direction R, the diverter 140A moves the fastener closer to the dial axis 112A and generally away from the outer dial perimeter 112P. Of course, this movement toward the dial axis can be reversed by orienting the diverters oppositely, so the fasteners move outwardly, away from the dial axis 112A. In such a case, the hopper 102, applicator 104 and heater 106 may be moved accordingly.

While the fasteners travel in the rows R1', R2', R3', etc., the fasteners move about the dial axis 112A, following generally circular paths until encountering the diverters which alter the circular path. As an example, the first circular path of row R1' is generally located outwardly from the second row R2' which forms a second circular path about the dial axis 112A. The various circular paths from the outer dial perimeter 112 toward the dial axis 112A can be generally concentric in configuration. Further, there can be any number of those rows and circular paths, depending on the particular application and the desired processing of the work pieces.

The machine 101 also can include an ejection point EP which is close to the dial axis 112A of the dial assembly 110. As shown, the exit point EP can be adjacent a last diverter 140L. That last diverter 140L can effectively transition a fastener in the circular path or row closest to the dial axis 112A off the work piece engaging surface 120 and onto a conveyor 103 or a waste bin, depending on whether the fastener is conforming or nonconforming. The dial assembly also can be positioned adjacent an inspection station 108 which can operate similar to the inspection station in the embodiment above.

The magnetic modules of the alternative embodiment can be constructed differently from those of the embodiments above. For example, with reference to FIGS. 16 and 16A, each of the respective magnetic modules 130A, 130B, 130C can be constructed a magnetic module "wedges" or "slices" that generally taper from a narrow point or end W1 near the axis to a broader, or wider end W2 near the dial perimeter. The wedges or slices can allow the modules to be placed adjacent one another about a circular shape as shown in FIG. 15.

Each magnetic module 130A, 130B, 130C can be constructed similarly, except for polarity orientation. For example, module 130A can be constructed to include a magnet 134A. The magnet 134A can be housed in a recess 130R defined between first and second magnetic pieces 131U and 131L, also referred to as wedges, slices or levels herein. These magnetic wedges can be pie-shaped, generally converging to a point or a narrowed end as they transition towards the dial axis 112A. The magnetic module 130A can include a work piece engaging surface 120 that engages the fasteners 90 so that the fastener longitudinal axes FLA is generally perpendicular to that surface 120. In this construction, the fastener longitudinal axes also can be parallel to the dial axis 112A.

The magnetic module 130A can include intermediate magnetic members or layers 132F and 132S with a non-magnetic member or layer 132NM placed therebetween. The intermediate members or layers can separate the magnet 134A from the work piece engaging surface 120. Optionally, the magnetic module 130A (as well as the other modules) can be mounted directly to a front surface of a support plate 112M which can serve as a primary dial member. Generally, the modules can be attached using fasteners, cement or other suitable materials or components.

Each of the respective magnetic modules 130 can extend from the outer dial perimeter 112P generally toward the axis 112A. The modules thereby orient their respective magnets along radial lines extending outwardly from the dial axis 112A. The sets of magnets of adjacent modules, for example, 130A and 130B, are separated from one another by spacer elements 131U and 131L, from each of the respective modules. These spacer elements can be wedge shaped and constructed either as a left-hand wedge or a right-hand wedge so that when they contact one another, they evenly space the sets of magnets of each of the modules 130A and 130B a preselected distance or a preselected angle Pα relative to one another. This angle Pα is relatively constant from a location adjacent or at the dial axis 112A to the outer perimeter 112P. With the spacer elements so constructed, the magnets of each of the modules can be of uniform thickness, from near the dial axis 112A to the perimeter 112P. The spacer elements wedge or slice shape allows the magnets to be disposed in a circular shape as shown in FIG. 15.

The magnetic modules 130 of this embodiment also can include magnets oriented similar to the magnets in the above embodiments. For example, the magnets of each adjacent module can be oriented in an alternating polarity configuration to form rows R1' R2', R3', etc. in circular paths about the axis 112A. For example, as shown in FIG. 16, the magnetic module 130A includes a first magnet 134A, and the second module 130B includes a second magnet 134B. The first magnet 134A is oriented so that its north pole faces toward and is adjacent the north pole of the second magnet 134B. The south pole of the first magnet 134A is separated from the south pole of the magnet 134B, with both of the first north pole and the second north pole of the first 134A and second 134B magnets located between those first and second south poles. Along the common axis CA' which can correspond to the circular path or row of fasteners on the work piece engaging surface 120, the magnets of adjacent modules have poles oriented in a pattern of north, south, south, north, north, south.

In this embodiment, all of the magnets, within a particular module, face and are oriented with their north/south axes aligned. For example, in the module 130A, all the first magnets 134A are all oriented with their north pole N facing upward or facing in a counterclockwise orientation, while all the south poles S of the first magnets 134A in that module 130A are oriented facing down or in a clockwise direction. The next or second module 130B, however, is configured so all of the second magnets 134B are facing with the south poles directed in a counterclockwise direction and the north poles are oriented facing in a clockwise direction. The next or third module 130C is oriented so that all of the third magnets 134C are oriented with the north pole of those magnets facing in a counterclockwise direction and the south pole of those magnets are oriented facing in a clockwise direction.

FIGS. 17-20 illustrate the respective left and right spacer elements in the form of wedges. Each of the spacer elements or wedges can be of a sufficient depth to house the intermediate layers 132F, 132S and the non-magnetic element 132NM, as well as the magnets 134 therebetween. Optionally, the spacer elements 131C, 132C (FIG. 16A) can form a module recess 130R, within which the magnet 134A fits. The spacer elements can also sandwich the layers 132F, 132S, and 132NM therebetween.

Figure 21:
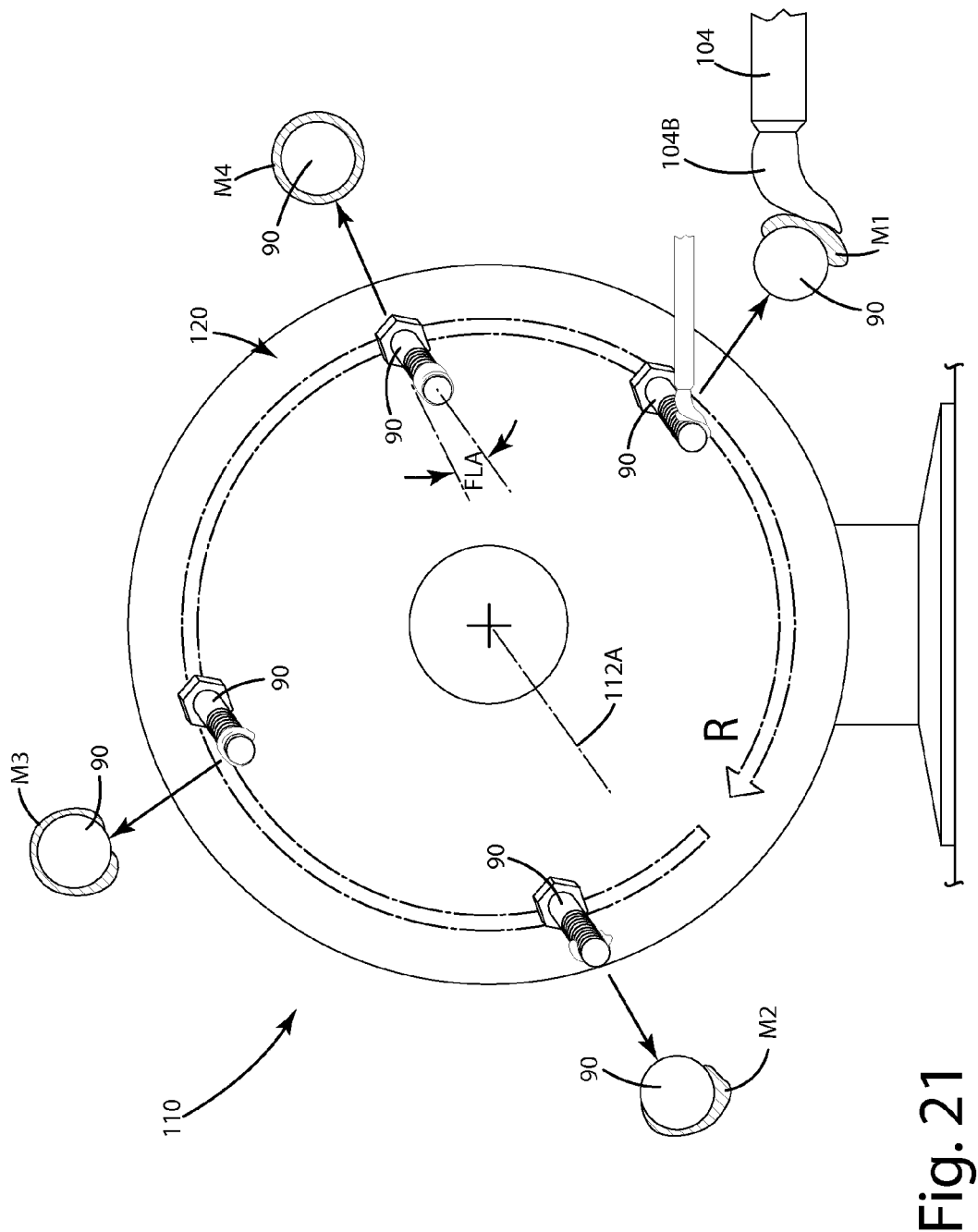
FIG. 21 is a schematic illustrating the manipulation of a material on work pieces as the work pieces traverse about a non-horizontal dial axis.

The method of operating the machine 101, and in particular, the dial assembly 110 will now be described with reference to FIGS. 15-21. Fasteners 90 are loaded into the feed station 102, which operates similarly to the feed station above to feed fasteners, head first through a track 102T so that the fasteners are placed adjacent and magnetically attracted to the work piece engaging surface 120. As shown in FIG. 16A, the fasteners 90 are joined so that their longitudinal axis FLA is generally parallel with the dial axis 112A and perpendicular to the work piece engaging surface 120. The fasteners rotate with the dial after being magnetically attracted to and held on the work piece engaging surface 120 until they pass the applicator 104. Generally, the dial rotates in direction R. At the applicator, material is applied to the fasteners in the first row R1' with a brush 104B or other applicator as described above. Optionally, the applicator can be disposed at other locations around the dial assembly 110 as desired. As shown in FIG. 21, the material M as applied can be in a liquid or gel form. The fasteners continue traveling in the first row R1' around the dial axis 112A in a circular path through the heater 6'. There, the fasteners are heated similar to the embodiment above. The fasteners in the row R1' continue to rotate toward the diverter 140A, which diverts the fasteners closer toward the dial axis 112A and generally away from the outer dial perimeter 112P. After passing the diverter, the fasteners are entered into the second row R2' and again traverse around the dial axis 112A in the direction R. However, the fasteners in second row R2' travel on a different circular path, namely, one that is located inwardly from the circular path along which they traveled in row R1'. These and other circular paths can be generally concentric with one another and can circle at least a portion of the dial axis 112A.

The fasteners are diverted by the diverters to other rows R3' etc., generally traveling along progressively smaller circular paths multiple more times, each time traversing closer to the dial axis 112A. Eventually, the fasteners pass the inspection station 108 to determine whether they are conforming or nonconforming. If they are conforming, they eventually exit the work piece engaging surface 120 near the center or dial axis 112A. A secondary conveyor 103 can be located there, near the dial axis 112A to capture ejected fasteners at the exit point EP and convey them to further processing or packaging operations. Optionally, the secondary conveyor can be a belt or chain conveyor, and can project through at least a portion of the dial assembly, near or at its center.

With the non-horizontal orientation of the dial assembly 110, it has been discovered that liquid, gel or other flowable materials applied to work pieces can be better distributed around outer surfaces of those work pieces. For example, as shown in FIG. 21, a liquid, gel or other flowable material M is applied at the application station 104 with brush 104B. It initially is applied about only a part of the outer surface of the fastener 90. As the dial assembly 110 rotates in direction R, the material flows or otherwise is distributed around the outer circumference of the fastener or other elongated work piece. This is illustrated where the material M2 extends farther around the outer circumference and/or threads of the fastener 90 than the material M when initially applied. This is further evidenced where material M3 of the fastener at the top of the dial is distributed even farther about the outer circumference. Again, it is believed that the liquid, gel or other flowable material simply flows under the force of gravity around the outer surfaces and/or circumference of the fastener. By the time the fastener reaches the location adjacent the hopper, the material M4 can optionally coat the entire outer surface, having flowed around that outer surface. Of course, it may take multiple rotations about the dial axis 112A to have an appropriate and/or desired coating of the material about the outer circumference.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A dial assembly for a machine adapted to apply material to a work piece, the dial assembly comprising:
   a dial including a first dial surface, a second opposing dial surface and an outer dial perimeter, the dial rotatable in a dial plane about a dial axis;
   a work piece engaging surface disposed at least one of around the outer dial perimeter, adjacent the first dial surface, and adjacent the second dial surface;
   a plurality of magnets disposed adjacent the work piece engaging surface, the plurality of magnets including a first magnet and a second magnet, the plurality of magnets placed adjacent one another in different rows, in magnetic communication with the work piece engaging surface, a first north pole of the first magnet positioned adjacent and facing a second north pole of the second magnet, with the first north pole of the first magnet and the second north pole of the second magnet disposed between a first south pole of the first magnet and the second south pole of the second magnet,
   wherein the plurality of magnets hold the work pieces against the dial in a first row and in a second row, the first row offset from the second row by a row separation distance along at least a portion of the first row,
   wherein the first magnet is joined with a first magnetic module, the first magnetic module including a first magnetic module housing, the first magnetic module housing defining a first module recess within which the first magnet is disposed, the first module recess extending toward the work piece engaging surface, the first magnetic module housing including a first magnetic member and a first non-magnetic member, the first non-magnetic member disposed between the first magnet and the work piece engaging surface, wherein the second magnet is joined with a second magnetic module, the second magnetic module including a second magnetic module housing, the second magnetic module housing defining a second module recess within which the second magnet is disposed, the second module recess extending toward the work piece engaging surface, the second magnetic module housing including a second magnetic member and a second non-magnetic member, the second non-magnetic member disposed between the second magnet and the work piece engaging surface.

2. The dial assembly of claim 1 comprising a diverter positioned adjacent the work piece engaging surface and configured to transfer the plurality of work pieces from the first row to the second row along at least one of the outer dial perimeter, the first dial surface, and the second dial surface.

3. The dial assembly of claim 2,
wherein the dial plane is generally horizontal,
wherein the work piece engaging surface is disposed around the outer dial perimeter,
wherein the second row is located at least one of above and below the first row.

4. The dial assembly of claim 2,
wherein the dial plane is generally vertical,
wherein the work piece engaging surface is adjacent the first dial surface,
wherein the first row is disposed along a first circular path,
wherein the second row is disposed along a second circular path,
wherein the diverter diverts the work pieces from the first circular path toward the second circular path.

5. The dial assembly of claim 4 wherein the first circular path and second circular path are generally concentric.

6. The dial assembly of claim 1 comprising a heating element disposed adjacent the work piece engaging surface, the heating element adapted to apply heat to the plurality of work pieces while the work pieces are magnetically held against the dial.

7. The dial assembly of claim 1 wherein the plurality of work pieces are a plurality of fasteners, each fastener including a first end having a head, a shaft joined with the head and extending toward a second end, and a fastener longitudinal axis extending from the first end toward the second end.

8. The dial assembly of claim 7,
wherein the dial is positioned adjacent a feed station that sequentially feeds individual ones of the plurality of fasteners so the head of each fastener is magnetically attracted to the work piece engaging surface, with the longitudinal axis of the fastener extending radially outward from the dial axis,
wherein the dial is positioned adjacent an application station that applies a material to the fasteners as the fasteners pass by the application station.

9. The dial assembly of claim 1, wherein the dial axis is at least one of horizontal and vertical.

10. The dial assembly of claim 1,
wherein the first magnetic module includes a first magnetic module upper surface,
wherein the second magnetic module is positioned adjacent the first magnetic module upper surface and fastened with fasteners thereto,
wherein the first magnetic module is disposed in a first module,
wherein the second magnetic module is disposed in a second module level located above the first module level.

11. The dial assembly of claim 1, wherein the plurality of magnets are adjacent one another, but separated by at least one magnetic module housing.

12. The dial assembly of claim 1 wherein the first magnet is in a different horizontal magnet row than the second magnet.

13. A dial assembly for a machine adapted to apply material to a work piece, the dial assembly comprising:
a dial including a first dial surface, a second opposing dial surface and an outer dial perimeter, the dial rotatable in a dial plane about a dial axis;
a work piece engaging surface disposed at least one of around the outer dial perimeter, adjacent the first dial surface, and adjacent the second dial surface;
a plurality of magnets disposed adjacent the work piece engaging surface, the plurality of magnets including a first magnet and a second magnet, the plurality of magnets placed adjacent one another in different rows, in magnetic communication with the work piece engaging surface, a first north pole of the first magnet positioned adjacent and facing a second north pole of the second magnet, with the first north pole of the first magnet and the second north pole of the second magnet disposed between a first south pole of the first magnet and the second south pole of the second magnet,
wherein the plurality of magnets hold the work pieces against the dial in a first row and in a second row, the first row offset from the second row by a row separation distance along at least a portion of the first row
wherein the dial includes a primary dial member, the primary dial member including an outer perimeter, the outer perimeter including a connector tongue,
wherein the first magnet is housed within a first magnetic module housing defining a first module recess,
wherein the connector tongue is disposed in the first module recess,
wherein the first magnetic module housing is secured to the connector tongue,
wherein the primary dial member includes a first arcuate segment joined with a second arcuate segment at a seam,
wherein the first magnetic module housing overlaps the first arcuate segment and the second arcuate segment,
wherein the first magnetic module housing spans across the seam.

14. A method of processing a plurality of elongated work pieces comprising:
providing a feed station adapted to feed a plurality of fasteners having longitudinal axes toward a dial assembly;
magnetically attracting the fasteners toward a work piece engaging surface of the dial assembly so that the fastener longitudinal axes of the fasteners project generally perpendicular to the work piece engaging surface;
rotating the dial assembly so that the plurality of fasteners move around a dial axis in a first row;
diverting the plurality of fasteners from the first row so that the plurality of fasteners move around the dial axis again in a second row, at least a portion of the first row being offset from the second row by a row separation distance;
applying a liquid material to the plurality of fasteners as the plurality of fasteners move around the dial axis;
applying heat to the plurality of fasteners during a first preselected period while the plurality of fasteners move about the dial axis in the first row;
applying heat to the plurality of fasteners a second preselected period while the plurality of fasteners are in the second row, wherein the first preselected period is about equal to the second preselected period; and removing the plurality of fasteners from the dial assembly.

15. The method of claim 14 wherein the liquid material is applied to the plurality of fasteners via an applicator disposed at a location adjacent the work piece engaging surface.

16. The method of claim 15 wherein the dial assembly rotates in a dial plane oriented 20° to 90° relative to a horizontal plane.

17. The method of claim 14 comprising providing a first magnet and a second magnet, the second magnet positioned adjacent the work piece engaging surface with a second north/south axis generally parallel to the work piece engaging surface, the second magnet positioned at least one of above and below the first magnet so that a first north pole of the first magnet is adjacent and facing the second north pole of the second magnet, and so that a first south pole of the first magnet and a second south pole of the second magnet are distal from one another, with the first and second north poles being located between the first and second south poles.

18. A method for applying a material to a fastener comprising:
providing a dial oriented in a non-horizontal plane, the dial including a dial axis about which the dial rotates in the non-horizontal plane, and a fastener engaging surface generally parallel to the non-horizontal plane;
providing a magnetic field adjacent the fastener engaging surface to magnetically hold a fastener, which includes a fastener longitudinal axis, adjacent the fastener engaging surface so that the fastener longitudinal axis is generally perpendicular to the non-horizontal plane;
rotating the dial in the non-horizontal plane;
providing a diverter adjacent the work piece engaging surface; and
moving the fastener toward the axis of the dial, as the dial rotates, with the diverter.

19. The method of claim 18 comprising applying a material to the fastener, wherein as the dial rotates in the rotating step, the material applied to the fastener is distributed around an outer surface of the fastener.

20. The method of claim 19,
wherein the material is liquid,
wherein the non-horizontal plane is substantially vertical,
wherein during the rotating step, the material flows around an outer circumference of the faster.

21. The method of claim 18,
wherein the dial axis is substantially horizontal,
wherein the fastener longitudinal axis is substantially parallel to the dial axis during the rotating step.

22. The method of claim 18 comprising maintaining the diverter in a fixed location relative to the axis,
wherein the diverter is at a preselected diverter angle relative to a first circular path upon which the fastener travels as the dial rotates,
wherein the diverter engages the fastener to move the fastener so that the fastener travels along a second circular path concentric with the first circular path.

* * * * *